US010679396B2

(12) United States Patent
Thielen et al.

(10) Patent No.: US 10,679,396 B2
(45) Date of Patent: Jun. 9, 2020

(54) HOLOGRAPHIC MULTI AVATAR TRAINING SYSTEM INTERFACE AND SONIFICATION ASSOCIATIVE TRAINING

(71) Applicant: Visyn Inc., Lino Lakes, MN (US)

(72) Inventors: Jeffrey Thielen, Lino Lakes, MN (US); Andrew John Blaylock, Minneapolis, MN (US)

(73) Assignee: Visyn Inc., Lino Lakes, MN (US)

( * ) Notice: Subject to any disclaimer, the term of this patent is extended or adjusted under 35 U.S.C. 154(b) by 0 days.

(21) Appl. No.: 16/035,280

(22) Filed: Jul. 13, 2018

(65) Prior Publication Data

US 2019/0019321 A1    Jan. 17, 2019

Related U.S. Application Data

(60) Provisional application No. 62/678,073, filed on May 30, 2018, provisional application No. 62/532,120, filed on Jul. 13, 2017.

(51) Int. Cl.

| G06T 13/40 | (2011.01) |
| G06T 19/00 | (2011.01) |
| G06T 19/20 | (2011.01) |
| G06F 3/16  | (2006.01) |
| G06F 3/01  | (2006.01) |
| G09B 19/00 | (2006.01) |
| G09B 5/06  | (2006.01) |

(52) U.S. Cl.
CPC ............ *G06T 13/40* (2013.01); *G06F 3/017* (2013.01); *G06F 3/167* (2013.01); *G06T 19/006* (2013.01); *G06T 19/20* (2013.01); *G09B 5/06* (2013.01); *G09B 5/065* (2013.01); *G09B 19/0038* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| 2012/0206577 | A1* | 8/2012 | Guckenberger | G09B 19/003 348/47 |
| 2014/0193132 | A1* | 7/2014 | Lee | H04N 21/42203 386/225 |
| 2015/0089551 | A1* | 3/2015 | Bruhn | H04N 7/106 725/80 |
| 2016/0101321 | A1* | 4/2016 | Aragones | A63B 24/0006 434/257 |
| 2016/0179206 | A1* | 6/2016 | LaForest | G06F 3/017 345/156 |
| 2018/0047200 | A1* | 2/2018 | O'Hara | G06K 9/3208 |

* cited by examiner

*Primary Examiner* — Yanna Wu
(74) *Attorney, Agent, or Firm* — Schwegman Lundberg & Woessner, P.A.

(57) ABSTRACT

A system or method for training may display a student avatar and an expert avatar. A method may include capturing movement of a user attempting a technique, and generating a student avatar animation from the captured movement. The method may include retrieving a 3D expert avatar animation corresponding to the technique. The method may include displaying the 3D student avatar animation and the 3D expert avatar animation. For example, the animations may be displayed concurrently.

20 Claims, 15 Drawing Sheets

HOLOGRAPHIC MULTI AVATAR TRAINING SYSTEM INTERFACE AND SONIFICATION ASSOCIATIVE TRAINING

CLAIM OF PRIORITY

This application claims the benefit of U.S. Provisional Patent Application Ser. No. 62/532,120, filed on Jul. 13, 2017 and U.S. Provisional Patent Application Ser. No. 62/678,073, filed on May 30, 2018, the benefit of priority of each of which is claimed hereby, and each of which are incorporated by reference herein in its entirety.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
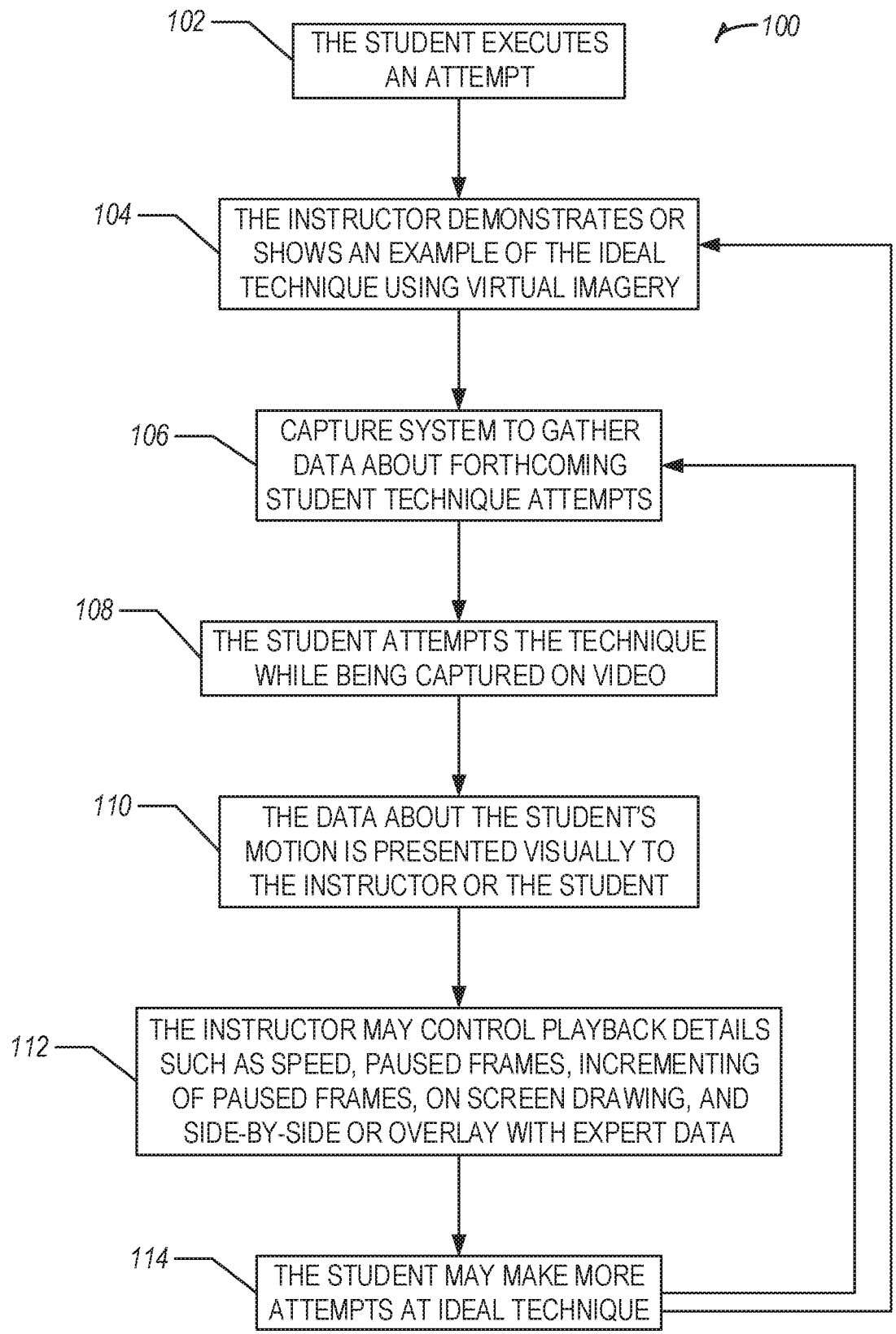
FIG. 1 shows a multi-media private lesson technique in accordance with some examples.

The systems and methods described herein provide private skill building or lesson enhancement specific to movement skill training and may use holographic imagery. The skill building may leverage sensing or display technologies to create a platform of interaction between an athlete, an instructor, and the human movement discipline that the athlete is pursuing.

A multi-media private lesson may encompass a video analysis lesson or a "Holographic Private Lesson". The video analysis lesson is multi-media because it involves real life imagery (instructor demonstration), verbal description, and video review.

In an example, a video analysis lesson is a private lesson. A private lesson is customized teaching by an expert to a novice of any of the human knowledge that exists. A private or video lesson may be conducted in sports where the subject matter is some action that an athlete takes in a sport and much of the lesson is not of information flow from the instructor to the student, or instead of a feedback loop of attempts at the technique and reinforcement or error correction by the instructor before a return to the student making attempts.

A video analysis lesson includes these pieces and changes the nature of the feedback. In addition to relying on the instructor to describe and or physically demonstrate correct form and details of the student's shortfalls during their attempts to match correct technique, the instructor is given the illustrative tool of video to help this process. In a video analysis lesson, demonstration of the technique to be attempted can be offloaded from the instructor as a task they may have to physically perform and instead can be done with video. This may be optional as some instructors may prefer to demonstrate during this stage of the process.

The video analysis lesson may benefit the student from a few different types of uses of the video of the student attempting to perform the technique. First, when the student has a strong cognitive model (mental understanding) of the technique, the video can make problems in the technique clear to the student without the instructor having to say anything. Second, the instructor can enhance the student's cognitive model of the technique and motivate corrections on subsequent attempts by using video to show the student and verbally guiding the student. Verbal guidance may include demanding the student to pay attention to certain things and to understand why those things are important. Possible areas to pay attention to may include certain body segments such as the hips, legs, shoulders, or whatever is relevant to the technique. The instructor may also point out which muscles are active at times. Graphics added to the image can help with this. Third, side-by-side and overlay video demonstration may be used. These provide idealized demonstrations and student attempts on the same screen at the same time. Mechanisms are in place to synch the timing and speed of the playback so the student can see what they are doing differently. Again, depending on the understanding level of the student, this may make things clear through the act of observing or may rely on guidance from the instructor. Slow motion, paused frames, and on-screen drawings to call out specific details may be tools added during three types of reviews.

FIG. 1 shows a multi-media private lesson technique 100. The technique 100 may include an operation 102 (Typically skipped when the student and instructor have worked together before) to allow the student to execute a series of attempts so that the instructor can figure out the best thing to focus on as a first operation in the lesson.

The technique 100 includes an operation 104 to allow the instructor to demonstrate or show using virtual imagery (video or an emergent display paradigm) an example of the ideal technique with emphasis on a certain action or actions within the technique which the student may try to implement.

The technique 100 includes an operation 106 to use a capture system to gather data about forthcoming student technique attempts (this may be a video camera or a more three-dimensional form of capture or a sensor).

The technique 100 includes an operation 108 to capture the student attempt on video. The instructor may be considering what to correct or even offering corrective advice at this stage in advance of reviewing the data. The total duration of this attempt is dependent on the technique in question. For discrete skills, such as a golf swing, baseball pitch, hockey shot, or tennis stroke, for example, the captured motion may be of the total time for one technique execution with a little bit of extra time at the beginning or the end. In an example, this is five seconds or less. For continuous skills such as a swimming stroke, running stride, or hockey skating stride multiple cycles through the technique are often captured and the duration can be as long as twenty seconds or more in some rare cases.

The technique 100 includes an operation 110 to display data about the student's motion visually to the instructor or the student. This presentation is typically equal to or longer than the capture time. When longer, this is because the replay is in slow motion or is repeated over multiple repetitions.

The technique 100 includes an operation 112 to provide a user interface for the instructor to control playback details such as speed, paused frames, incrementing of paused frames, on screen drawing, and side-by-side or overlay with expert data. A decision is based on the instructor's judgement about what form the information may take in order to efficiently influence the student's subsequent performance in a positive way.

The technique 100 includes an operation 114 to allow the student to make more attempts at ideal technique while suitably informed about corrections and foci for upcoming attempts. This entails working through operations 106, 108, 110, and 112 again. This loop through that sequence of operations may continue until the end of the lesson unless the instructor or the student become satisfied with progress on the technique in question. When this happens then the technique 100 may return to operation 104 to provide new demonstration information for a new technique that they may work on.

The Holographic Private Lesson is a unique medium and may use some interface elements. They are manifested in interface solutions and are used in operation 112 and help the instructor to make understanding acquisition as efficient as possible for the student. They may also be used in operations 104, 106, and 110. Intelligent Software Assistance is used in these same places as a way to funnel the instructor toward "best practices" that can be anticipated while building the system. This helps get the display close to correct when a certain mode is first implemented so the instructor can quickly get display elements positioned for maximum utility.

Sonification Associative Training is a preparatory process that allows real-time feedback via the audio channel to be utilized during student attempts. As such this may be used as a one-off addition to operation 108. When a new positional feedback encoding (sound quality gradient over certain positional ranges for specific body segments) may be provided to the student so they can properly interpret sound quality details during their attempts, operation 108 may include the Sonification Associative Training process described below and may include attempts featuring sonification feedback. In an example, real time feedback can be presented visually. This may again be part of operation 108 as this operation is where the student is performing the technique.

Graphical Embellishments are analogues to how the instructor draws on the screen in a video analysis lesson. Ideal model movement data may be predetermined and used to create the graphical embellishments. Methods for making the graphical embellishments dynamic so as to provide information about the student's performance (which lies in the student's motion data) may be useful to providing utility via their use during student motion review. They may be used in operations 110 and 112, or embellishments may be used in operation 104.

Adding these pieces into the technique 100 above includes advancements over the video analysis lesson which leverage opportunities that three-dimensional display systems enable. Advancements may include adjustments to control mechanisms for the process that the extra freedom in three-dimensional display or capture systems create.

The following discussion includes details about what the Holographic Private Lesson in contrast with a video review lesson. In a Holographic Private Lesson, real-life demonstration is still a tool that an instructor can use, or they can also rely on prefabricated three-dimensional imagery. Prefabricated imagery may be virtual. Virtual imagery is presented in 3D using a head-mounted mixed reality device (e.g. a "Hololens" device by Microsoft Corporation of Redmond, Wash.), a head-mounted virtual reality device, or another holographic display technology. In an example, some version of a target model for the movement that the athlete is trying to learn can be displayed in this way. In another example, the student's motion may not be captured with a camera, or may be quantified in four dimensions (three spatial dimensions and one time dimension) by an existing or emerging sensor system built for this purpose.

Figure 2A:
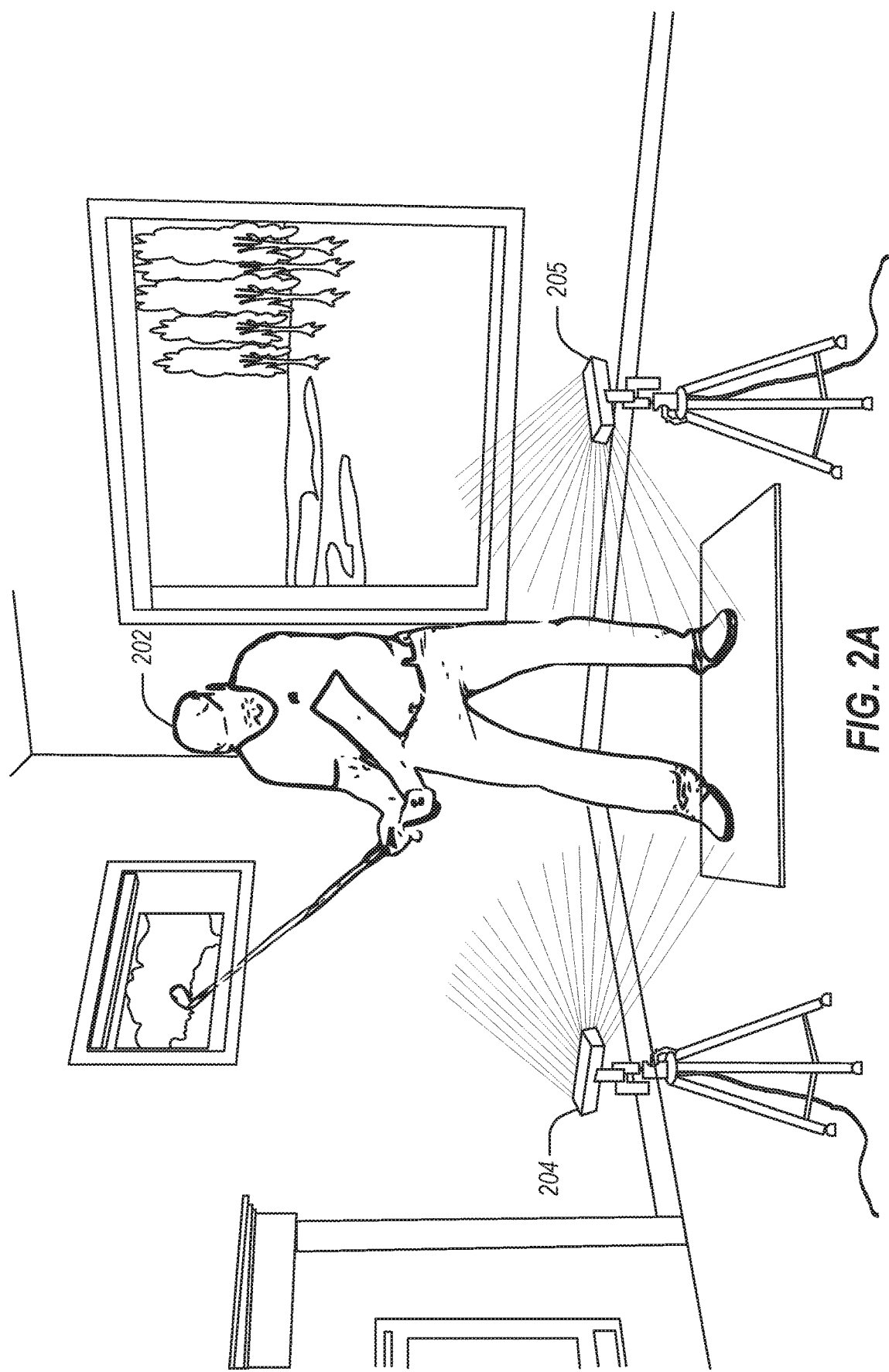
FIG. 2A illustrates a student-motion capture system in accordance with some examples.

FIG. 2A illustrates a student-motion capture system in accordance with some examples. The motion capture system includes a capture device 204, which may include a sensor for capturing the student 202. A second capture device 205 may also be used to improve capture data. In an example, the capture device 204 may be a depth camera, a device including position or location sensors (e.g., infrared sensors, ultrasonic sensors, or the like), etc.

Figure 2B:
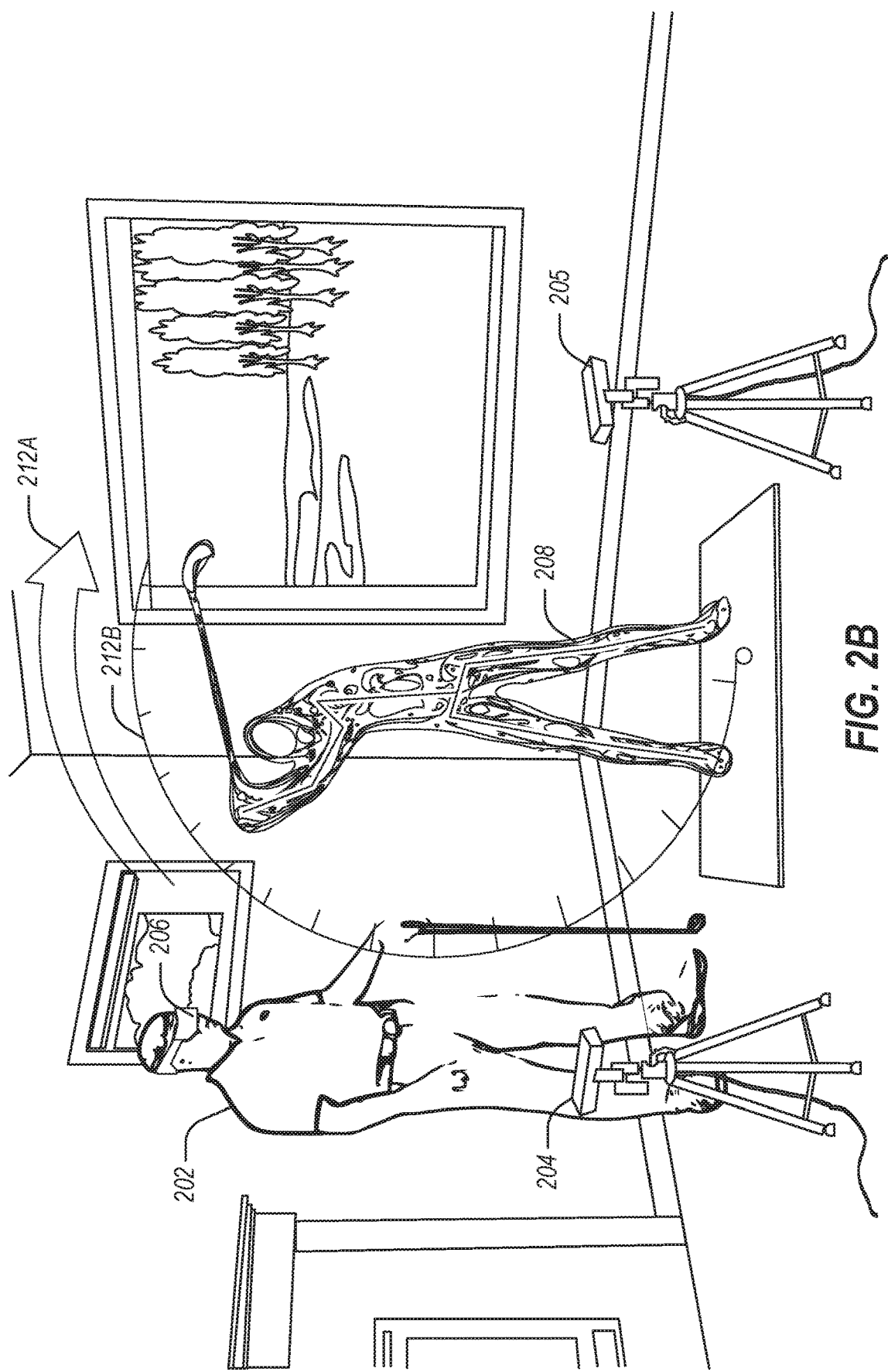
FIG. 2B illustrates a graphical embellishment with an expert avatar display system in accordance with some examples.

FIG. 2B illustrates a graphical embellishment 212 (e.g., arrow 212A, or gauge 212B) with an expert avatar display system in accordance with some examples. The graphical embellishment 212 illustrates an aspect of a technique the student 202 is attempting to learn while watching an expert avatar 208. The student may be wearing a mixed reality headset 206 for viewing 3D animation, embellishment, or images.

The Holographic Private Lesson may far surpass video review in terms of the salience of the information provided. Information may be provided before the athlete attempts a movement to help the athlete internalize a model of the motion they are attempting. It may also be used before an attempt in order to improve an already existing model of the motion relating to a detail of the movement. Information may also be feedback following an attempt at the motion that offers insight into the athlete's ability to perform the movement efficiently, correctly, or similar to the target model (which are highly interrelated). The nature and timing of this feedback is applicable to the rate of learning. This system may dramatically increase the salience, and thus the effect of this information.

After quantifying student motion using a motion sensor (e.g., 204), a spatiotemporal model of the human motion may be generated and stored in the computer memory in the form of the measured values associated with the motion. This may also be described as a skeletal tracking model. This model can then be applied to an animation rig. An animation rig is a coherent system that can take arbitrary spatiotemporal motion models and interpret them as sequences of body positions. Further, the rig also contains textures and location specifications for those textures such that for each of those positions, it mimics how light may reflect off of the textures and into a virtual camera or multiple virtual cameras. In an example, the skeletal tracking model may be applied to a virtualized skeleton within the animation rig, where the outer surface of the animation rig is dependent on these skeletal positions, and where that outer surface comprises a human like 3D figure. In an example, the positions of this animation rig skeleton are set to match the positions dictated by the skeletal tracking model for each instant where the skeletal tracking model is defined in time. As a result, virtual images of the animation model in each of the series of positions that are defined by the motion model are produced in sequence. This visually recreates the motion of the athlete which was captured by the sensors.

In a stereoscopic head-set-based embodiment, for each frame in the sequence, multiple images may be created. In an example, one image is for the right eye and a second image is for the left eye. For example, an image is created based on directing one of the virtual cameras to where the right eye of the viewer is located and another image is created based on directing another virtual camera to where the left eye of the viewer is located. Then, these images are displayed separately to each eye. This creates the 3D effect and allows the student 202 to see their movement from a third person perspective. Once this is done, viewing angle and even frame rate are controllable by the wearer of the stereoscopic headset 206 which may be the athlete (or student 202) or the instructor. In an example, the athlete or the instructor are users of the present system.

In addition to the information salience advantage that stereoscopic display offers, there is another difference between a video analysis lesson and a Holographic Private Lesson that derives from opportunities that arise from the replacement of the video camera as the method for capturing movement of the athlete with a motion capturing sensor. With this 3D motion sensing system in place, quantification of body position in three spatial dimensions and one time dimension allows for precise calculation of relative positions. This may include calculating distances between body parts, angles made at joints, or angles made from some external reference such as the ground or the vertical direction. Additionally, in the case of a sport where the student 202 holds an object, such as a golf club, hockey stick, baseball bat, or the like, measurements can be made with respect to the object itself and the student's body or an external reference such as the vertical axis or the ground. In an example, the location and position of the student's body can be used to determine some points in space around the student 202 which can be used as measurement reference. Determination may be made on an instantaneous position of the body such as a starting position or dynamically as the body moves. When the points in space are determined at a starting position, a good example use case may be to position targets around to which the student 202 may attempt to move their limbs.

These types of quantification of movement data enable the system to offer real-time feedback. Real-time feedback may be based on a formula which is calculated based on the student's movement data. Examples of types of data which may be used to calculate feedback types include instantaneous position data, motion data calculated from differences in the moment to moment position data, or ideal model comparison data calculated as differences between the student's position or motion and the ideal model's position or motion. Real-time feedback may then be displayed to the student 202 visually in the head mounted display or using auditory signals.

By displaying a visualization of an ideal model and the up-to-the-moment position information specific to the student 202, differences in student position compared to ideal model can be understood and adjusted for in real time. Choosing the position, size, and other aspects of this side-by-side display or possibly overlay display are discussed below. In an example, these reviews may not be done in real-time as the student 202 actually performs the movement (e.g., may be done offline). In an example, the methods described herein may be used to prepare for a real-time use case, where a student or expert model avatars (e.g., expert avatar 208) may be positioned and sized prior to the motion is attempted. In another example, the avatars may be positioned or sized during the review as described below.

Research shows that the human mind has limitations in terms of its ability to concentrate on a multitude of tasks. While concentrating on the position or movement of the body while receiving this real-time feedback, the complexity of the real-time feedback that can be provided may be limited. To some degree, the task being asked of the athlete may be simplified to allow a balance between the cognitive loads of feedback utilization and body control production. Over time, the athlete may move some of the feedback interpretation to automatic control allowing more direct attention on the body control side. The same cannot be said for the body control side because the point of the training is to create improvement on body control and wisely designed training may progress the body control task complexity as skill develops. As a result, in an embodiment, adding complexity to the feedback signal itself in response to athletes habituating to the system may be avoided because advantages gained may be better funneled toward allowing the athlete to better focus on the ever-more-complex movement tasks.

Figure 3:
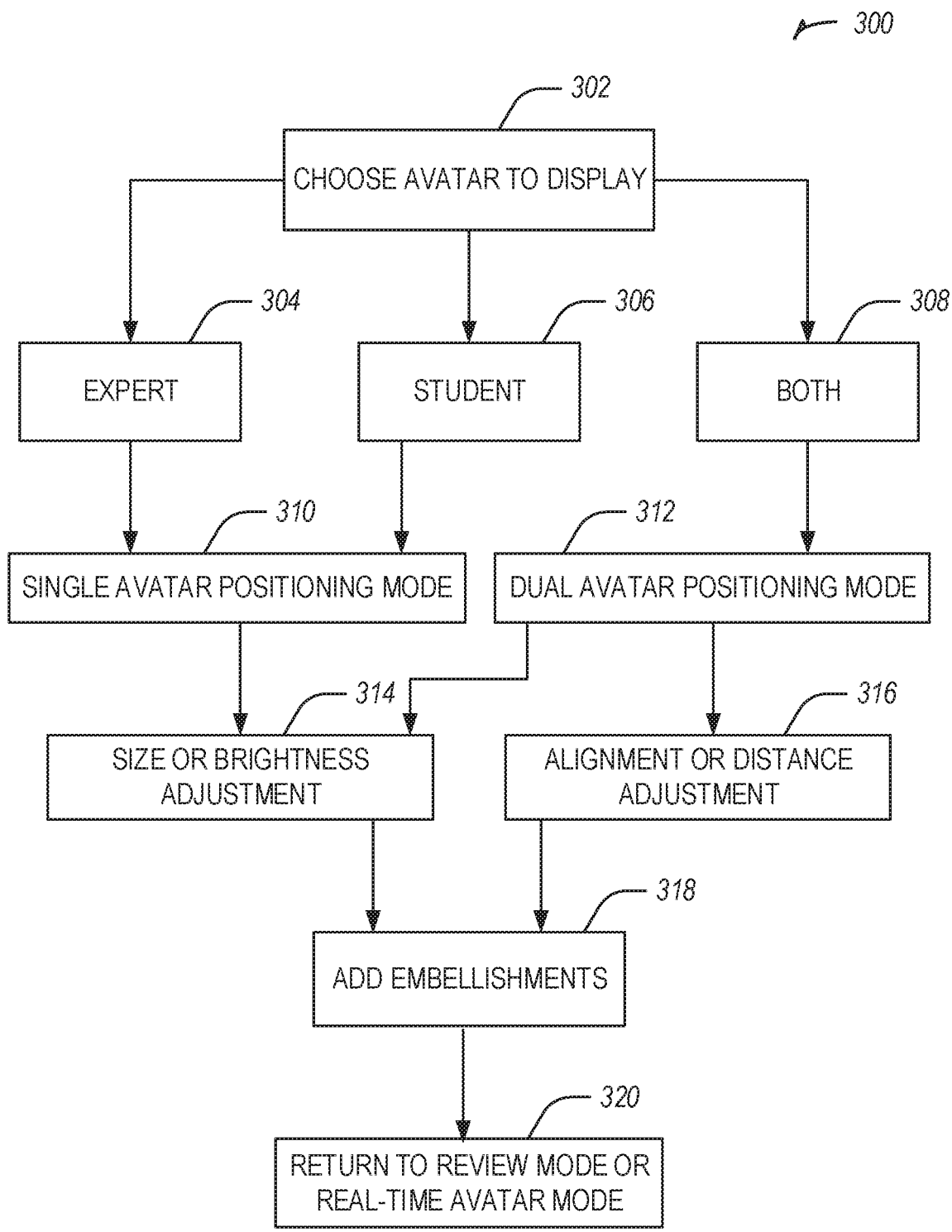
FIG. 3 illustrates a flowchart showing a technique for setting up a holographic avatar lesson in accordance with some examples.

FIG. 3 illustrates a flowchart showing a technique 300 for setting up a holographic avatar lesson in accordance with some examples.

The technique 300 includes an operation 302 to choose a mode, such as which avatar to display.

The technique 300 includes an operation 304 to initiate an expert avatar.

The technique 300 includes an operation 306 to initiate a student avatar.

The technique 300 includes an operation 308 to initiate both an expert and a student avatar.

The technique 300 includes an operation 310 to generate a single avatar positioning mode in response to operation 304 or 306.

The technique 300 includes an operation 312 to generate a dual avatar positioning mode in response to operation 308.

The technique 300 includes an operation 314 to adjust size or brightness of an avatar, such as automatically or based on user input.

The technique 300 includes an operation 316 to adjust alignment or distance between the expert and the student avatar in response to operation 312.

The technique 300 includes an operation 318 to optionally add embellishments to a field of view. Embellishments may be added automatically or selected via a selection menu.

The technique 300 includes an operation 320 to return to review mode or real-time avatar mode (or repeat technique 300) in response to completing a viewing or display of an avatar, or in response to a user indication to end technique 300.

Figure 4:
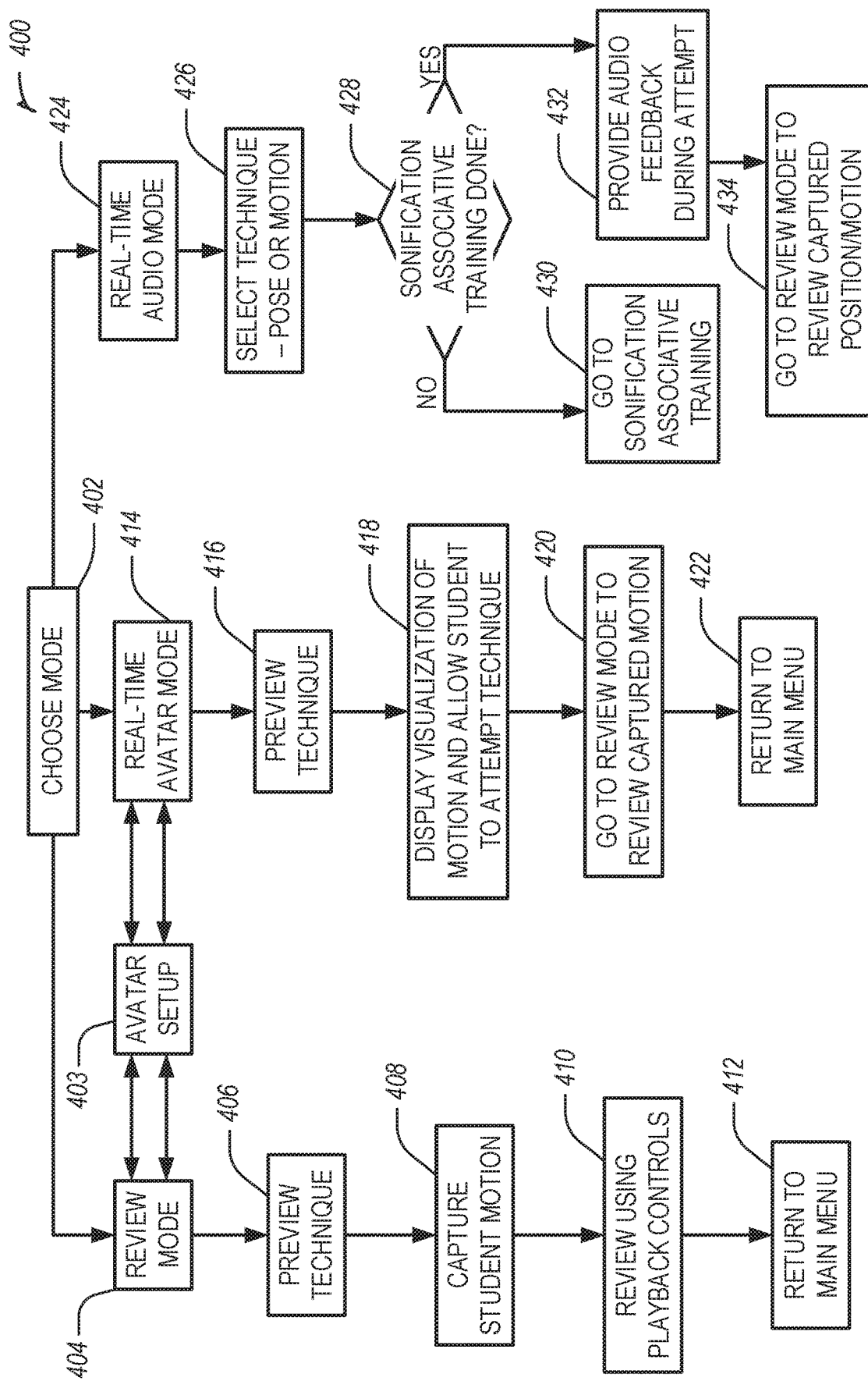
FIG. 4 illustrates a flowchart showing a technique for displaying and navigating a holographic avatar lesson in accordance with some examples.

FIG. 4 illustrates a flowchart showing a technique 400 for displaying and navigating a holographic avatar lesson in accordance with some examples.

The technique 400 includes an operation 402 to choose a mode.

The technique 400 includes an operation 404 to activate a review mode in response to a selection made at operation 402.

The technique 400 includes an operation 403 to initiate an avatar setup. Operation 403 may be performed in a first time accessing the review mode and may be skipped in subsequent accesses.

The technique 400 includes an operation 406 to preview a technique (e.g., using a previously recorded or generated expert avatar performing the technique). In this operation, technique may mean a movement, pose, or other action, such as for a sport or activity.

The technique 400 includes an operation 408 to capture student motion (e.g., using a 3D motion capture system).

The technique 400 includes an operation 410 to review the technique (e.g., using a previously recorded or generated expert avatar performing the technique or using the captured student motion to generate an avatar for review).

The technique 400 includes an operation 412 to return to a main menu (e.g., repeat operation 402 to choose a mode).

The technique 400 includes an operation 414 to activate a real-time avatar mode in response to a selection made at operation 402. Operation 414 may access operation 403 to initiate an avatar setup. Operation 403 may be performed in conjunction with operation 414 in a first time accessing the review mode and may be skipped in subsequent accesses.

The technique 400 includes an operation 416 to preview a technique (similar to operation 406).

The technique 400 includes an operation 418 to display a visualization of motion and allow a student to attempt the technique.

The technique 400 includes an operation 420 to go to the review mode at operation 404, to review captured motion from the student.

The technique 400 includes an operation 422 to return to a main menu (e.g., repeat operation 402 to choose a mode).

The technique 400 includes an operation 424 to activate a real-time audio mode in response to a selection made at operation 402.

The technique 400 includes an operation 426 to select a technique, including a pose or a motion.

The technique 400 includes an operation 428 to determine whether sonification associative training has been completed by the user. In an example, operation 428 may be performed initially and then skipped for subsequent iterations.

The technique 400 includes an operation 430 to go to sonification associative training if not yet done.

The technique 400 includes an operation 432 to provide audio feedback during an attempt.

The technique 400 includes an operation 434 to go to a review mode to review captured position or motion.

Figure 2C:
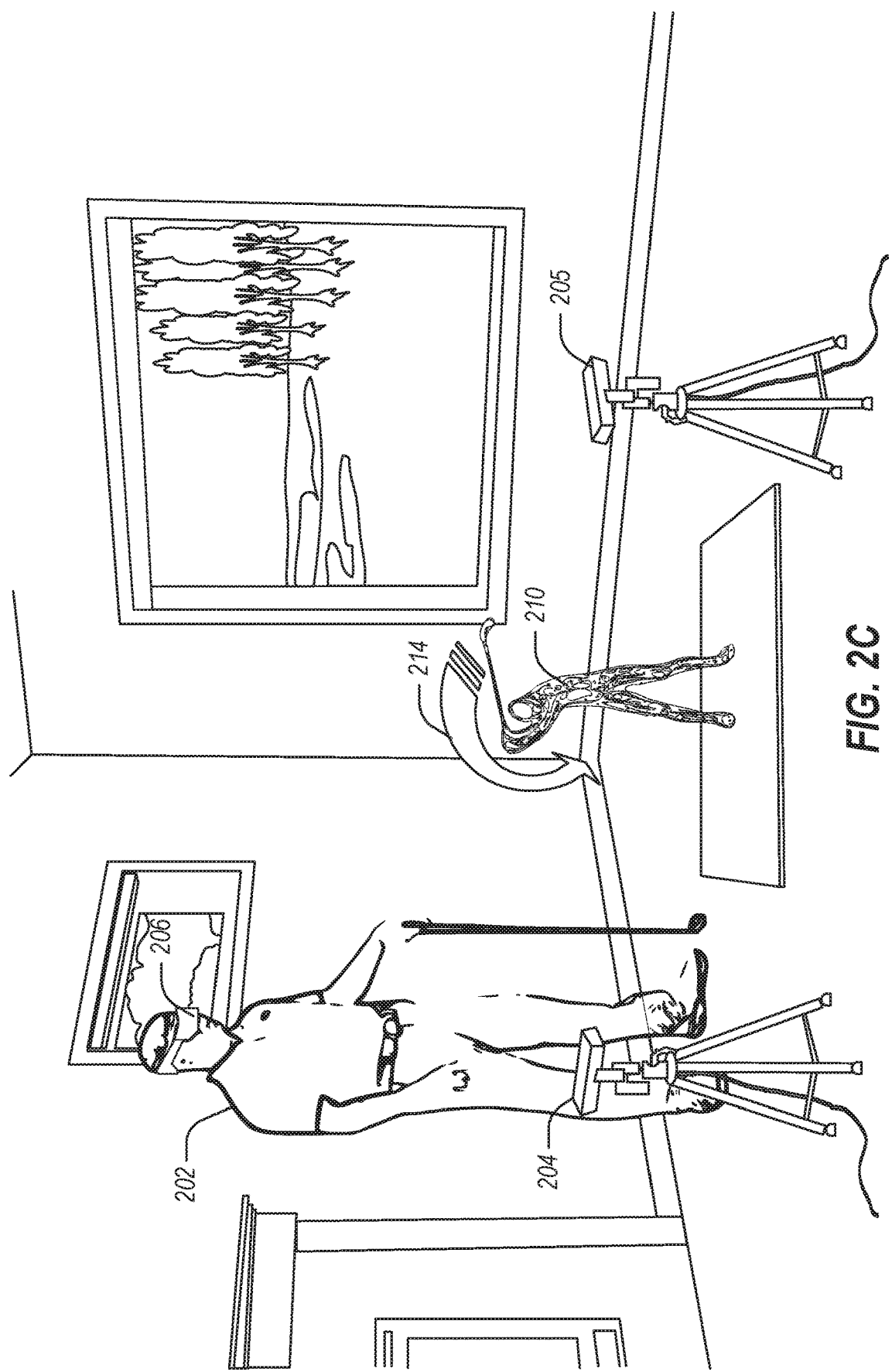
FIG. 2C illustrates a graphical embellishment with a student avatar display system in accordance with some examples.
Figure 2D:
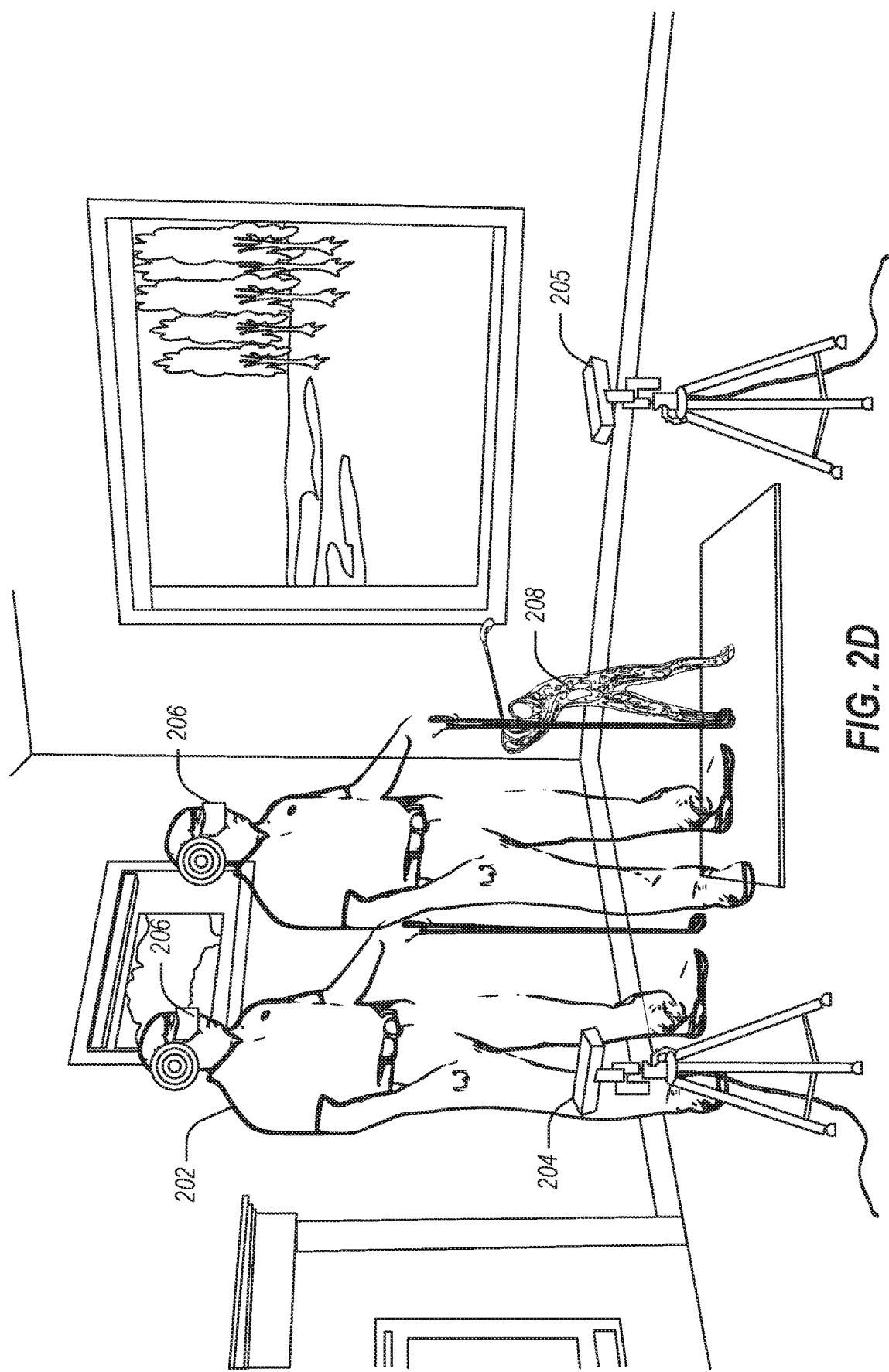
FIG. 2D illustrates a sonification associative training system in accordance with some examples.
Figure 2E:
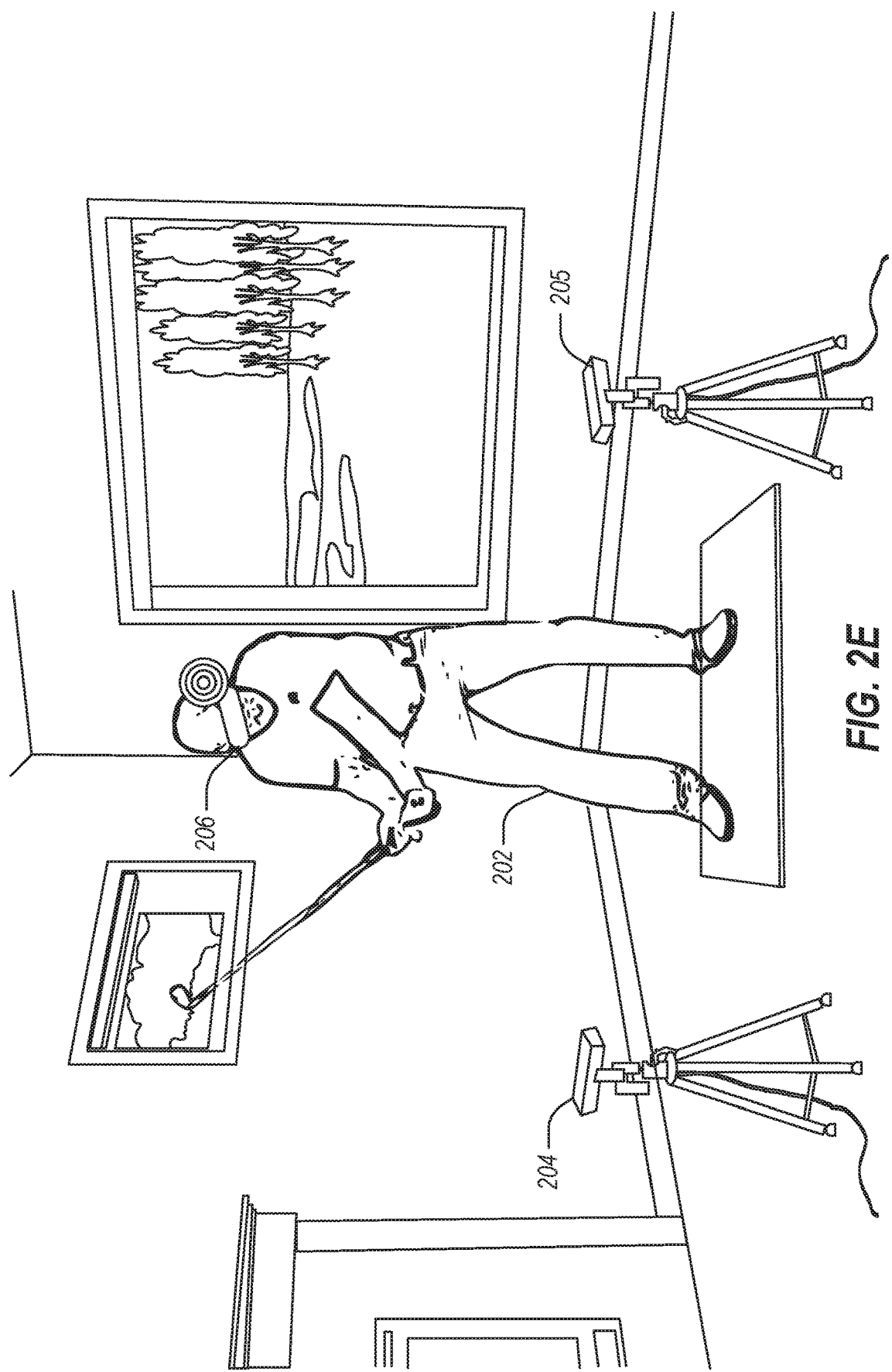
FIG. 2E illustrates a pose matching system using auditory feedback in accordance with some examples.
Figure 2F:
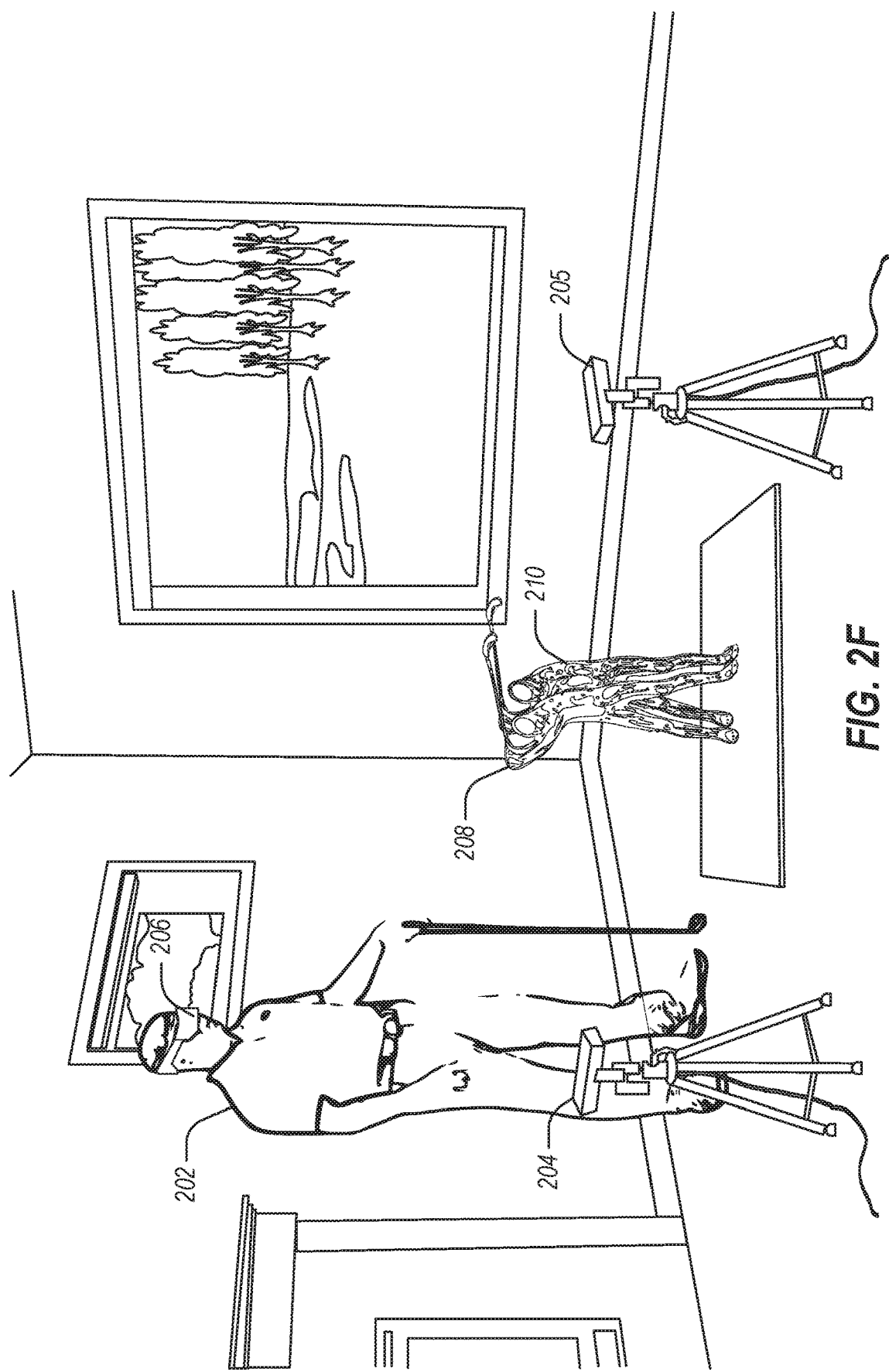
FIG. 2F illustrates a student and expert avatar overlay display system in accordance with some examples.

FIG. 2F illustrates a student and expert avatar overlay display system in accordance with some examples. The student avatar 210 and the expert avatar 208 may be displayed concurrently. Playing avatars concurrently means playing the avatars at the same time, including simultaneously (e.g., time-aligned playback) or with a delay or offset (e.g., the student avatar 210 a few milliseconds or seconds ahead or behind the expert avatar 208). In an example, the student avatar 210 and the expert avatar 208 are overlapped according to a central position, such as a center of mass, a joint (e.g., a hip where rotation about the hip occurs during a golf swing, for example), or according to a maximum overlap. The student 202 may view the student avatar 210 and the expert avatar 208 using the mixed reality headset 206.

Figure 2G:
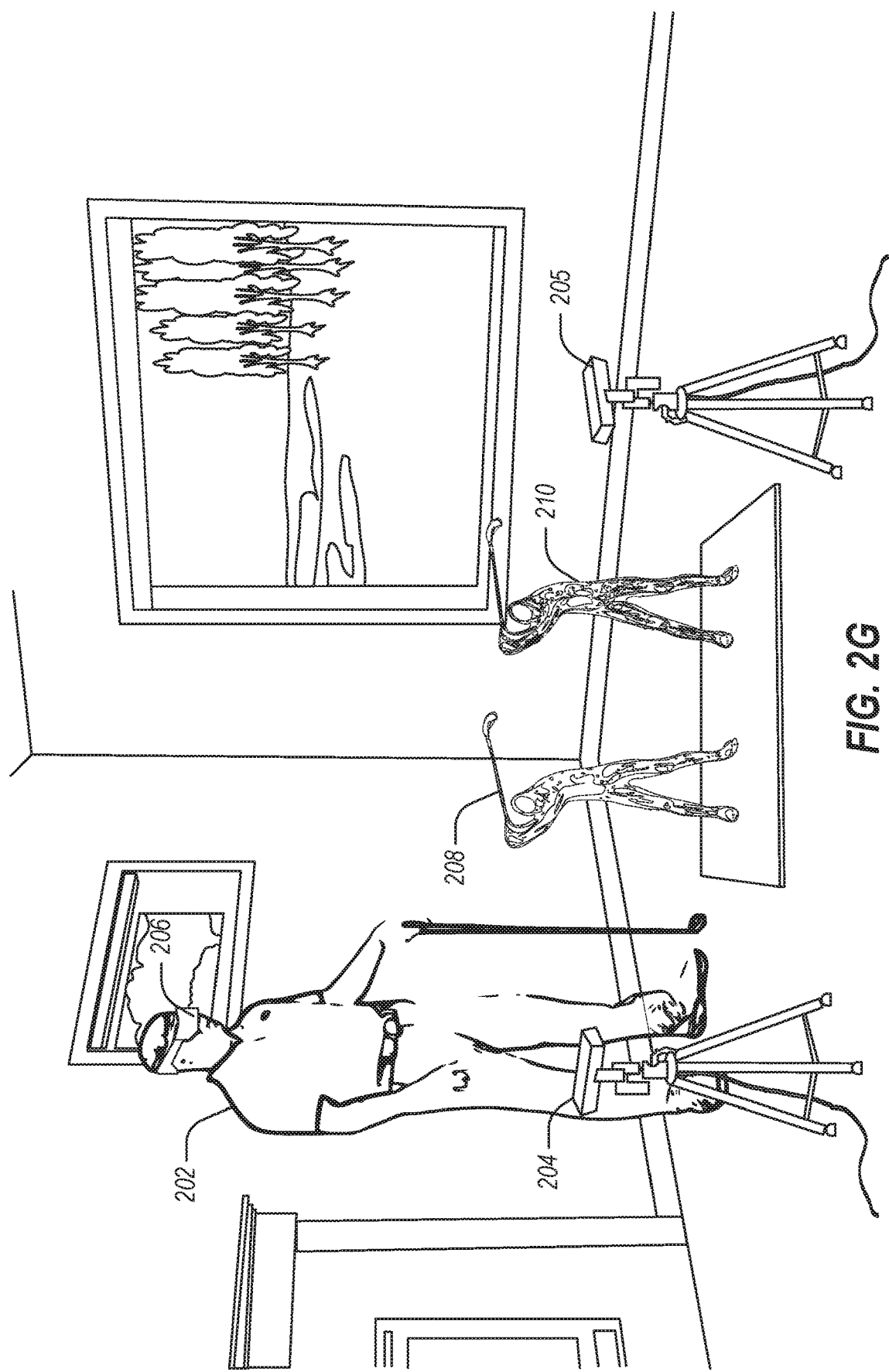
FIG. 2G illustrates a student and expert avatar side-by-side display system in accordance with some examples.

FIG. 2G illustrates a student and expert avatar side-by-side display system in accordance with some examples. In the example shown in FIG. 2G, the student avatar 210 and the expert avatar 208 are offset a specified width apart. In either of the examples shown in FIGS. 2F-2G, the student avatar 210 and the expert avatar 208 may be played concurrently (e.g., expert 208 behind student 210 or vice versa). Playing avatars concurrently means playing the avatars at the same time, including simultaneously (e.g., time-aligned playback) or with a delay or offset (e.g., the student avatar 210 a few milliseconds or seconds ahead or behind the expert avatar 208). The student avatar 210 and the expert avatar 208 may be displayed with a visual differentiation (e.g., different color, salience, brightness, visual effect, such as blinking, or the like).

Comparing athlete motion to a target, or expert, motion is a major part of what people value about video analysis lessons. The Holographic Private Lesson may take this to another level. Much of this type of training is based on showing movement models of an expert in the same field of view as the motion of the student 202. In an example, the Holographic Private Lesson presents challenges on how to display the two movement models. The default case is to show them side-by-side. An alternative is to show them overlaid on top of one another in the same visual space.

In an example, an avatar is a representation of a human body. In some cases the avatar may be manipulated to visually recreate the motion a person created using a system designed to quantify that motion. An avatar that can be manipulated to recreate a motion is sometimes called an "animation rig". A motion model may be a quantified motion (or "motion capture file") applied to the avatar to create the full visual experience of seeing a human figure execute the motion.

In an example, two avatars may be displayed in a viewing area each with their own motion capture file applied. One of these is an expert avatar 208 which, when the expert motion capture file is applied, is a representation of an expert version of the motion the student 202 is attempting. The second is a student motion model, which is created when a motion capture file captured from the student during the holographic private lesson process is applied to the student avatar 210. These may have visual differentiation (e.g., different colors) to enable students to keep track of which is the expert avatar 208 and which is the student avatar 210.

In the Holographic Private Lesson, the models of the target ("expert") motion and the student motion are both three-dimensional motion models where some quantified human motion is applied to an animation rig. This allows the athlete to see the comparison maybe using two animation rigs, each moving based on a separate motion capture file, in the environment at the same time. In an example, the environment may mean the actual space the student 202 is in, in the case of mixed reality, or a virtual room or scene, in the case of virtual reality.

Design parameters are discussed below:

1. How to make the avatars face the same way? When the avatars do not face the same way it adds cognitive load to the process of trying to understand what planes and axes of rotation are present in the expert model and may be present in the student's model. In an example, cognitive load may be minimized in the process of conveying the distinctions between the two models and what sort of change is used to more closely match the expert.

2. How to manipulate how far apart to position the avatars? Distance between two avatars in a side-by-side mode exhibits a tension between each benefiting from having their own space so as to allow details of each's motion to stand out and being too far apart such that perception of the comparison between the two becomes cumbersome. The best balance may be determined as a skill in the art by the instructor and may depend on the size of the avatars in the physical space in which the lesson is taking place.

3. How to set the system up to display an "overlay" of the two avatars (overlay is a display mode where two avatars are placed in the same space as one another to really highlight any mismatches)? Overlay mode may lose the clear salience that each avatar's motion has when they each have their own space, but may enhance the ability to compare motions between the two. This is a feature that has specific information transfer use cases in a multi-media private lesson setting.

4. How to manipulate the brightness of one avatar or the other in order to draw attention to the brighter avatar? Verbal and gestural communication between instructor and student can direct the student's attention to create an efficient lesson, and, graphical assistance can help with this. Allowing the instructor to place emphasis on one or another avatar may assist in this aspect of the process.

5. How to manipulate the physical size of the avatars? One does not want to have to stand back from the avatar in order to see the full motion in a high resolution field of view (or even at all as current mixed reality displays may have limited range for the virtual portion of the field of view) so resizing the avatar allows the instructor to ensure easy viewing of the right parts of the technique.

The following additional design considerations are solved in an embodiment of a Holographic Private Lesson.

1. How to synch up the two avatars so they display at the same speed (ensuring that the full duration of technique execution is the same with the same start and stop positioning)?

2. How to do a freeze frame? Note: A freeze frame gives the instructor time to talk about positional details while that position persists. In addition, the student 202 can choose their view in this freeze frame condition to really understand details of the position just by moving their head around the avatar(s).

3. How to increment frames when in a freeze frame condition?

The solution to the above problems can be implemented via a designed user interface. Note that each of these solutions is modular with respect to the overall system. In some use cases, one or more of these functions may not be used. As such, they can be implemented as into a Holographic Private Lesson system. In an example, fine tuning may use the interface solution discussed here.

Some manipulation systems in Mixed Reality or Virtual Reality are designed around the use of devices held in the student's hands which allow the student to "click" in a similar way to a mouse click and then apply motion by moving their hand with the device in it ("Device-in-hand"). Other mixed reality or virtual reality systems use no device in the hand and offer a gesture based "click" mechanism ("hand tracking"). Finally, some allow the student 202 to manipulate the imagery in the environment with voice controls ("voice control").

Figure 5A:
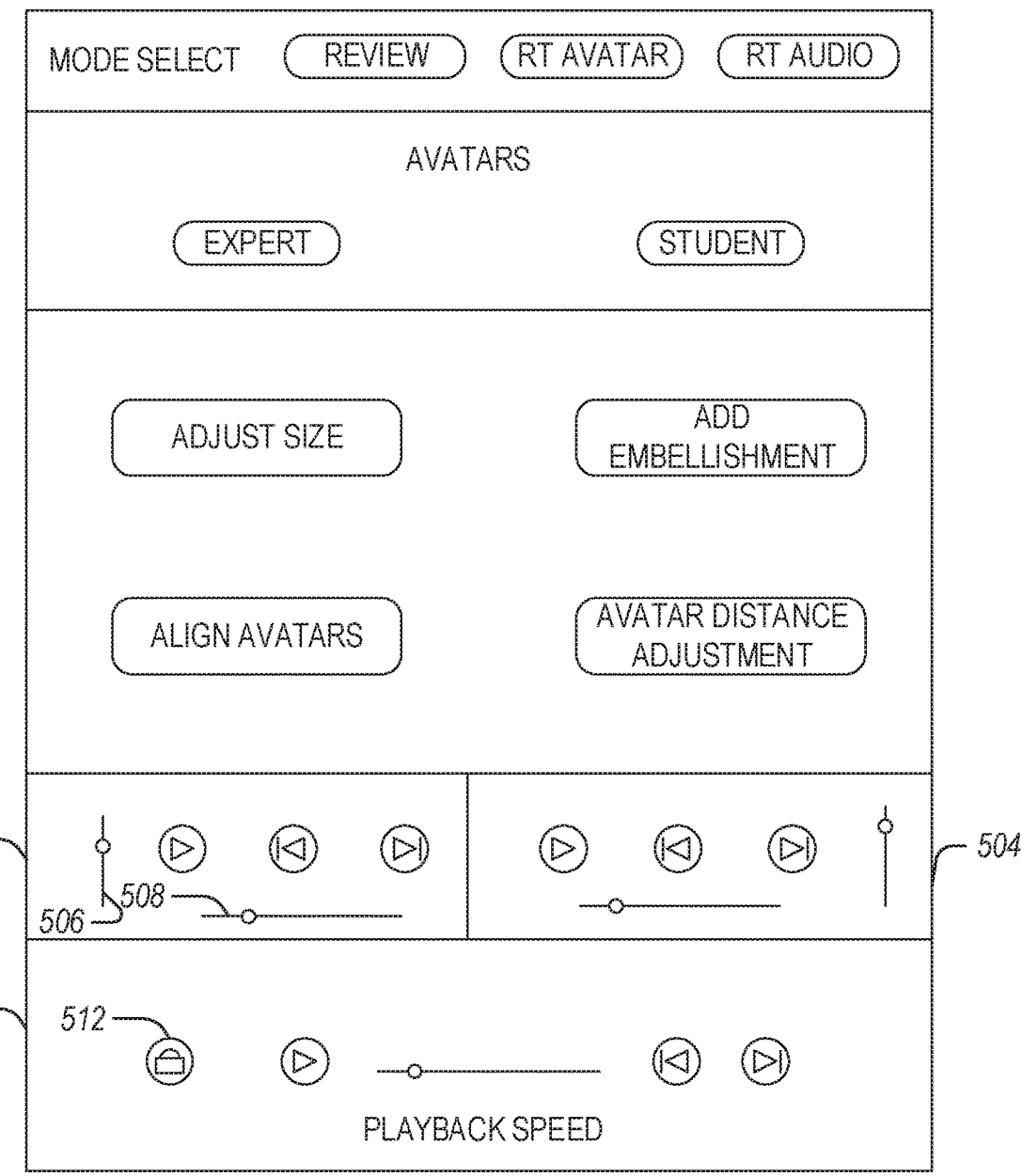
FIG. 5A-5B illustrate example user interfaces in accordance with some examples.
Figure 5B:
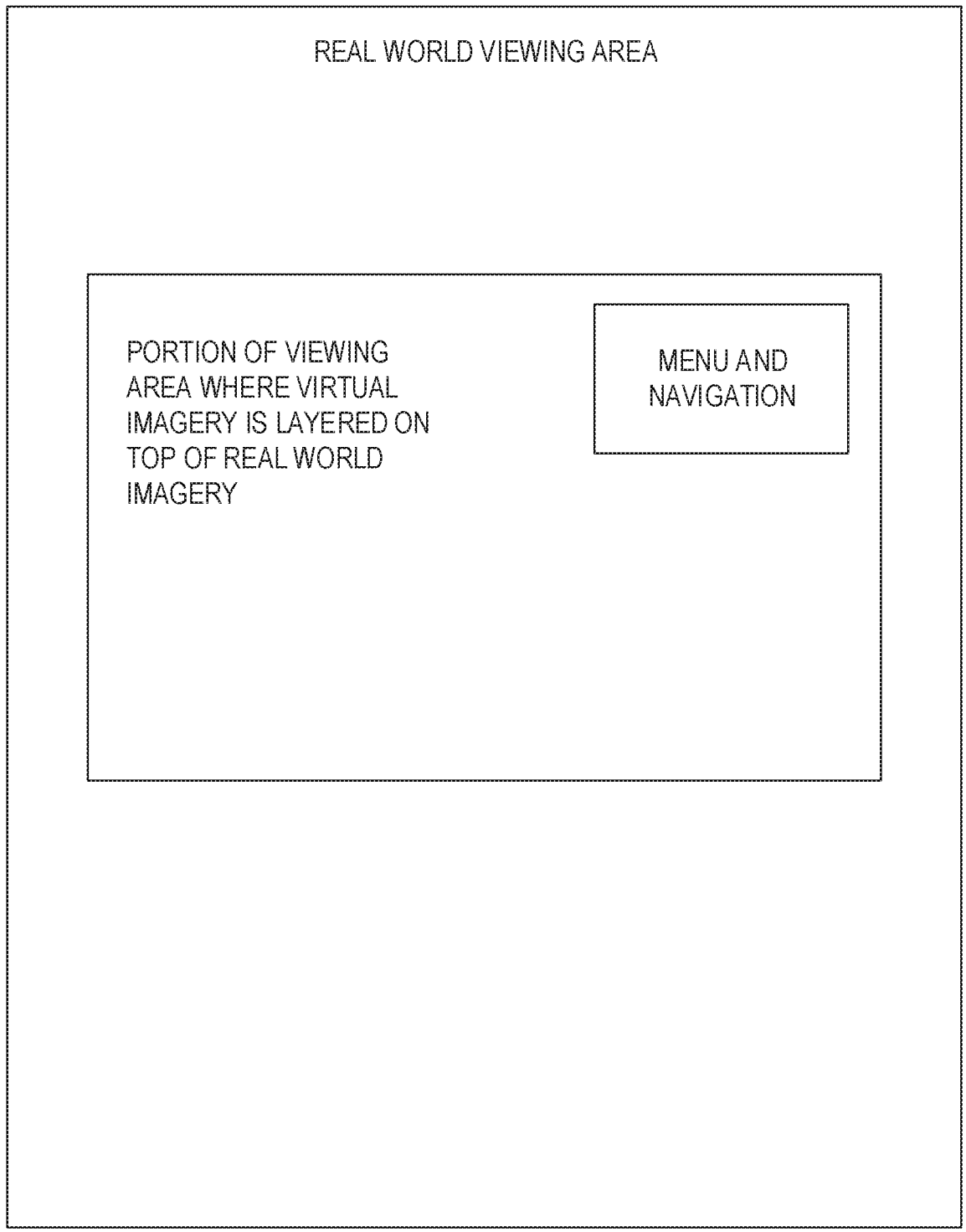

FIG. 5A-5B illustrate example user interfaces in accordance with some examples.

All of the solutions below may have an interface component placed in a menu off to the side of the virtual imagery field of the display device (e.g., in one of the upper corners) which enables the functionality described below or gives access to their functionality as described below. Alternatively, the menu may be hidden and toggled into a visible form that may be placed anywhere on the screen using a double click, a click of a specific button mapped for this purpose, a certain gesture, or a voice command. Also, in a Holographic Private Lesson it may be best for the athlete to not have these interface tools and instead to have a clean view of the movement models and other salient teaching information that the system may provide.

How to make the avatars face the same way?

Device-in-hand—The user (usually the instructor, but not always in these interface cases) may move their hand that is holding the tracked device up to a position in line-of-sight with the interface menu and hover over the "avatar alignment" module which may glow in response to the hover over action. This and other menu modules described below may look and behave like a web link. Alternatively, they may look like labeled buttons. The user may then click the device to activate the avatar alignment. This may show toggle pods extending off of the front of each of the avatars (e.g., the front of the "body" of the avatar). Then, when the user hovers over and then clicks and holds a toggle, each toggle can be rotated around the center of the animation rig dragging the animation rig around with it. The user may drag each around until satisfied with the direction that each is pointing. To get out of the avatar alignment state, the user may again hover over the avatar alignment module and click. The appearance of the clickable link or button for the alignment module may change appearance to indicate that it has been pressed and the avatar alignment state has been activated.

Hand tracking—This may work identically with the device-in-hand case, except the display system tracks the hands instead of the device in the user's hands and can sense "gestures" or pre-defined hand position sequences that are assigned "effects" that the user can apply to the system (certain static hand positions may be used as gestures). As a result, hovering over the interface element remains and is executed via the same line-of-sight mechanism, and in an example, the click is replaced with a specific hand gesture. In a click and hold case, a mid-point hand position of the movement that comprises gesture may be maintained so the system knows that the user intends an action that has a duration.

Voice control—Fine adjustment makes voice control an inefficient option for detailed adjustment of avatar orientation. Although it may be used as a "mode" toggle. The user may say something like "activate avatar alignment" to get into the mode where the alignment toggles are active. Further, once alignment has been achieved, rotations of a pre-specified number of degrees which move both avatars simultaneously or substantially simultaneously to allow for better viewing from side angles or whatever the instructor uses to make information more salient may be implemented via voice commands.

How to manipulate how far apart to position the avatars?

Device-in-hand—The user may move their hand with the device up to a position in line with the interface menu and hover over the "avatar width" module which may glow in response to the hover over action. The user may then click the device to activate the avatar width adjustment. This may show three points on a line. It may have one point each for the bottom center or exact center of the avatars and then one extra point for the point exactly between those two points. These may act as toggles for adjustment by "clicking" on a toggle as described above. During adjustment, the center point may be kept stationary and both of the other two points may move symmetrically toward or away from the center point to ensure the center point stays perfectly between the two avatars. Alternatively, an additional slide bar may be displayed above the two models. In this embodiment, the distance can be adjusted by hovering over the slide bar with both hands, clicking and holding, and pulling the hands apart. This two-handed slide bar may adjust the distance between the models to the width of the hands until the user unclicks. In an alternative embodiment, this may be done with one hand by using a bar that slides to the right to make the distance between the models greater and to the left to make it smaller. To get out of the avatar width state, the user may again hover over the avatar width module and click.

Hand tracking—This may work identically with the device-in-hand case, except the display system tracks the hands instead of the device in the user's hands and can sense gestures. As a result, hovering over the interface element remains and may be executed via the same line-of-sight mechanism, and in an example, the click is replaced with a specific hand gesture. To facilitate use of the adjustment toggles or the "slide right" slide bar, a click and hold method may be used. In this case, a mid-point of the motion of the "click" gesture may be maintained so the system knows that the user intends an action that has a duration (and a start point which begins with the click action and ends with the release-of-click action of the gesture). An additional option is made available for a two sided slide bar embodiment. In a hand tracking case, a single hand may be used to manipulate a slide bar by hovering over the bar such that the thumb and index finger are in line-of-sight with the two ends of the bar and then widening or narrowing the distance between the fingers to adjust the distance between the avatar models.

Voice control—Fine adjustment makes voice control an inefficient option for detailed tweaking of distance between the avatars. Although voice controls may be used as a "mode" toggle. The user may say something like "activate avatar width" to get into the mode where the alignment toggles are active.

How to set the system up to display an overlay of the two avatars?

Device-in-hand—The process may work exactly like the side-by-side width adjustment. The overlay may be created by bringing the hands all the way together such that the distance between the two avatars becomes zero, creating an overlay.

Hand tracking—Once again, gestures that bring the avatars to zero distance apart may create an overlay. When it is in the case of using two hands, the hands may be brought together. When it is in the case of using the fingers on a two-sided slide bar, pinching the fingers together is the gesture to create an overlay.

Voice control—Voice control be used as a "mode" toggle. The user may say something like "activate avatar width" to get into the mode where the alignment toggles are active. In an example, it may work to say "activate overlay" and this may create the overlay mode.

How to modify the salience level of one hologram or another?

Device-in-hand—The user may move their hand that is holding the tracked device up to a position in line-of-sight with the interface menu and hover over the "avatar brightness" module which may glow in response to the hover over action. The user may then click the device to activate the motion model brightness mode. This may show a slider bar 506 and some buttons for activating different sub modes. Any of the sub-modes can be the first active by default. In one sub-mode (activated by using the line-of-sight and click method), the slider bar 506 may toggle the brightness of both the expert avatar and the user avatar on one bar. On the bar may be a slider knob. With the knob in the middle, both model avatars may be fully bright. With the slider fully left or right, one avatar may be fully dimmed and the other may be fully bright. And, as the slider moves toward either end from the middle, one avatar may gradually dim. Another sub-mode may offer independent control bars for each avatar. Moving the slider on one of these bars may make the avatar fully bright. Moving the slider left may make the avatar gradually dim until reaching the fully dim condition with the slider moved all the way left. A final sub-mode may automatically cycle between one avatar being dim and the other being bright and vice versa. This may offer additional control for how many movement skill repetitions may transpire during the brightness cycle. Settings may be one rep per cycle or two reps per cycle. When selecting this sub-mode, the slider bar 506 may disappear and buttons may appear to allow the selection of the cycle rate. To leave this avatar brightness adjustment mode, the user may click the button they clicked to activate the mode again and the avatar brightness settings may be kept while allowing for other adjustments.

Hand tracking—This may work identically with the device-in-hand case, except the display system tracks the hands instead of the device in the user's hands and can sense "gestures" or pre-defined hand position sequences that are assigned "effects" that the user can apply to the system (certain static hand positions may be used as gestures). As a result, hovering over the interface element remains and may be executed via the same line-of-sight mechanism, and in an example, the click is replaced with a specific hand gesture. In a click and hold case, such as when dragging a slider toggle (slider knob), a mid-point hand position of the movement that comprises gesture may be maintained so the system knows that the user intends an action that has a duration. An additional option is available for salience control using hand controls though. The system may be made to identify a gesture that involves making a fist, opening that fist into a flat open hand position, dragging the open hand over an area in line-of-sight of the headset (and the user's eyes), and then reclosing the first to signify the end of the gesture. Doing this may enable the instructor to select a specific area of one of the avatars for an impromptu spot-shadow effect. In effect, the user may wave their hand over the part of the avatar they want to highlight and the program may then make that part bright and the rest dimmer. Alternatively, the selected part may be made a different color. Once the selection is made, similar controls to those described above may be used to adjust relative brightness between the selected part and the rest.

Voice control—Fine adjustment makes voice control an inefficient option for detailed adjustment of avatar brightness. Although it may be used as a "mode" toggle. The user may say something like "activate avatar brightness adjustment" to get into the mode brightness functions area active. Further commands may get the user into sub-modes. Commands like "dim student avatar" or "enhance target avatar"

may also be used to make gross pre-set changes to avatar brightness in a fast-on-the-fly way.

Note that the same exact control methodology may be used to instead control each avatar's salience with respect to skin-level vs. skeletal-level brightness. The purpose here is to offer information to the student about how the outer skin of a human body may move during the movement (what one may see in real life, even though inference about things which happen at deeper layers of the body is of interest), or about how the components of the skeleton interact during the movement. For example, skin-level brightness may be chosen when the aim is to convey what the motion may look like in the natural context of watching another person execute the task. And skeletal-level brightness may be for observing deep body information, usually not accessible to human observation. To be clear, skeletal-level brightness may imply dimming of the skin-level. Skin-level brightness may not require skeletal-level dimming, because the skin obscures the skeleton and this may happen automatically in an animation rig if the opacity of the skin is high. However, dimming of the skeletal-level may be useful if opacity isn't high on the skin level.

Note also that the animation rig from which avatars may be designed may be built with three layers. These are skin layer, muscle layer, and skeletal layer. Both the skin and muscle layers fill the full space that a human body may fill at each moment during the technique (which is how humans are used to learning by watching), while the skeletal layer provides line-like connections from joint to joint (the bones) which make joint angle information more precisely salient. The general use cases for the avatars are to focus on either of the skin layer or the skeletal layer to access both of their inherent types of information. In an example, the muscle layer can also be used to create interesting aesthetics or to display muscle activation information. Muscle activation information may be derived from the expertise of a domain expert with respect to the technique in question, inverse kinematics on the motion model, or directly from EMG measurements during an expert's execution of the technique. These activations may be rendered on the muscle layers by making the active muscles glow or change color.

How to manipulate the physical size of the avatars?

Device-in-hand—The user may move their hand with the device up to a position in line with the interface menu and hover over the "avatar size" module which may glow in response to the hover over action. The user may then click the device to activate the avatar size adjustment. This may show a glowing bar that hovers at the top of both avatars in the case of side by side or overlay or just the one avatar during single avatar review. The rest of this may assume that the system is in side by side or overlay mode. This bar has a height above the ground which represents the height of the avatar. This may act as the adjustable surface and the user can "click" on the bar as described for the device-in-hand adjustments above. During adjustment, the center point between the two avatars may be kept stationary. In an example, the distance between the two avatars may be scaled with the height adjustment. And, to be clear, the height adjustment does not only adjust avatar heights. It may adjust the avatars to scale in three dimensions. Also, both avatars may adjust simultaneously or substantially simultaneously so that they maintain the same size. Alternatively, an additional slide bar may be displayed in the display area. In this embodiment, the height (and, to keep proper dimensions, avatar size) can be adjusted by hovering over the slide bar with one hand, clicking and holding the toggle, and moving the hand along the slide bar to adjust size to suit. To get out of the avatar size state, the user may again hover over the avatar size module and click.

Hand tracking—This may work identically with the device-in-hand case, except the display system tracks the hands instead of the device in the user's hands and can sense gestures. As a result, hovering over the interface element remains and may executed via the same line-of-sight mechanism, and in an example, the click is replaced with a specific hand gesture. To facilitate use of the height adjustment bar or the "slide right" slide bar, a click and hold method may be used. In this case, a mid-point of the motion of the "click" gesture may be maintained so the system knows that the user intends an action that has a duration (and a start point which begins with the click action and ends with the release-of-click action of the gesture).

Voice control—Fine adjustment makes voice control an inefficient option for detailed tweaking of avatar size. Although voice controls may be used as a "mode" toggle. The user may say something like "activate avatar size" to get into the mode where the size adjustment systems are active. Also, rough adjustments can be made by snapping between preset sizes with specific commands such as "table size" or "full size". And incremental rough adjustments can be made using commands such as "bigger" or "smaller". As with the hand-based adjustments, it may be useful to scale the distance between avatars simultaneously or substantially simultaneously with the size adjustments in voice control implementations.

How to synch up the motion models so they display at the same speed and with the same start and stop positions?

Hand-based control—In the menu area, there may be one playback speed slider 508 for each motion model (e.g., expert 502 and student 504) and a toggle switch to lock and unlock them relative to one another. In order to make sure the two motion models 502 and 504 stay at the same relative playback speed this may be toggled to the locked mode at input 512 making sure that these speeds are not adjusted relative to one another on accident once synched up (in synched control area 510). In an example, it may be unlocked when adjusting the relative speed between the motion models. The instructor can tweak the playback speed slide bars to get the playback speed to match. In general, the relative timing between positions in the technique from person to person may not match perfectly, so getting timing to match may include making the full durations from the beginnings to the ends of the techniques to line up. Though different alignments may be used to compare like positions to like positions. To create start-point alignment between the motion models, an "align clips" item may be available in the menu, which, when clicked, may get the system into a state that allows the motion models to be manipulated independently using scrub bars to advance or regress each of the avatar's motion model playback position (again, in default mode, the playback relative playback speeds of the two techniques may be locked when doing this adjustment). Then the instructor may maneuver the clips independently until they got into the same point in the technique. Then the "align clips" menu item may be clicked again to lock them in the established time sequence registration. It may be best to adjust playback rate after getting the start point alignment as a first operation. Also, in an embodiment, there may be a third playback speed slider that is used to control both motion models simultaneously or substantially simultaneously for slow motion review at various speeds.

Voice control—Once again voice control may not be efficient for fine adjustment but may be used as a "mode" toggle. The user may say something like "activate align clips" to get into said mode.

How to do a freeze frame?

Hand-based control—In one embodiment, the user may hover over the avatars and click to freeze the motion. Alternatively, there may be a "pause" button in the menu and the user may hover over that and click to make it pause. In an example, it may turn into a "play" button until it is clicked again and to return to motion.

Voice control—A voice command can be used to freeze the motion. It may be something like "freeze" and then to get back going again, "resume".

How to increment frames when in a freeze frame condition?

Hand-based control—The standard solution for this is to include a "scrub bar" that has a toggle which can be pulled forward or backward along the bar to find the right spot in the clip. This may be included in the menu area and may be manipulated with a click and hold function just as it is on YouTube or, any computer video player app. Alternatively, the motion may be incremented using a rotating motion of the hand in front of the user's body. The hand may be moved in a clockwise motion from the user's point of view to move the model animations forward in time and counter clockwise to move backward in time. Also, for each rotation, the system may advance a certain number of frames. This may be 10 frames per rotation. Then, by rotating faster the user may increment the motion at a higher rate, or slow the hand down to increment more slowly.

Voice control—Voice control here is really about getting into this "freeze" condition so this is the same as the freeze frame concept above.

The side by side and overlay comparison modes may be done in a delayed feedback mode meaning that after the student attempts a technique that the comparison information is delivered. With this system, a quantified student motion can be pulled from a sensor in real-time (with minimal noticeable latency, possibly negligible latency in the future based on improving compute speed and sensor capability). As a result, a side by side comparison or overlay can be displayed to the student in real-time.

Also, it is worth highlighting that motion graphics can be applied to both the expert and the student avatar during side by side comparison or to either motion model individually to help build understanding. When the motion graphics ("motion graphics" is a term of art for two-or-three-dimensional elements that sort of float in a virtual space which are added to a 3D animation to accentuate or embellish and element of the scene a 3D animation artist is creating) are applied to the student avatar, they may be prefabricated concept indicators, or may be made to reflect data coming off of the sensors. The motion graphics may include embellishments. The embellishments may be used to call attention to or add information about the details of the motion of one or both of the student and expert avatars. A great example is to show the trajectory of a golf club's shaft so as to make clear and salient the swing plane that was executed by the student, though more examples are provided below.

Software may handle some of this automatically. The avatars may have their "fronts" aligned by default, and may point a certain way relative to the users. The front may be defined based on the position of the student's chest at the beginning of the technique or similar. In an example, when the student makes a strange version of the motion, this may mess with what may be defined as the "front" of the student avatar, and as such, may mess with this process, so some fine tuning adjustment may be useful.

Avatar size may be adjustable. Based on any given size, a specified distance between the expert and the student avatars may be set between where the distance is defined as the distance between the center of the avatars or the bottom center of the avatars. The idea is the distance may be set such that the avatars are close enough for easy simultaneous or substantially simultaneous viewing and yet far enough to not "collide" with each other during the animated motion. The ratio between the height and the distance between the avatars may be held constant to make sure that a good distance is set prior to any adjustment by the users. When adjustment ability is not included, then a direct toggle (voice or hover-and-click) to overlay mode may be used.

The system may pre-match the motion models. It may be programmed in a way that leverages knowledge of the technique to include dependable starting and stopping point. Many techniques may have stationary points (for at least parts of the body). These may be markers for starting and stopping points. Also, there may be points where velocity along a certain dimension changes from positive to negative or vice versa indicating that the motion model was instantaneously stationary relative to the measurement reference and that can be used to identify reliable points in the technique.

When a starting point can be identified, alignment of the "start" of the technique can be set by making these points match. Once the matching of the starting points is established, the speed of the technique for either of the motion models can be scaled to ensure that the stop point may occur at the same time. The one with the shorter duration between the start point and the stop point can be made longer until it matches the duration of the other one, or the one with the longer duration can be made shorter. In both cases, the relative playback speed is what is scaled to make the motion take a longer or shorter time.

This exact procedure may also be done multiple times on the same movement sequence, when more points than just the start and stop points can be identified. In these cases, it works exactly as described above for each segment of the technique. First, one may put the start points in alignment and then, second, scale the speed so the stop points line up. In an example, when done in this sort of a sequence-of-components way the first components stop point is automatically the next component in the sequence's start point. This is true for adjacent components in the sequence. By doing this, a great comparison can be achieved for similar positions between the two techniques throughout the sequence (Though this leads to less salient information as to the relative timing and this may be accounted for when doing training focused on timing. A more timing-focused mode may be accessed in a main menu.)

The start and stop points discussed may pertain to the technique itself (or a segment of the technique) not the full duration of the motion file, so when these are put into alignment, one may start before the other. One may also stop after the other. This can be handled by just displaying the other model in its static first or last position in the motion file, or the portions of each of the files that do not overlap may be discarded for this display function. This ensures both files not only match up in terms of the time sequence of the technique, but also in terms of total time sequence which eliminates awkwardness arising from mismatch in start and stop points of the motion files.

Figure 6:
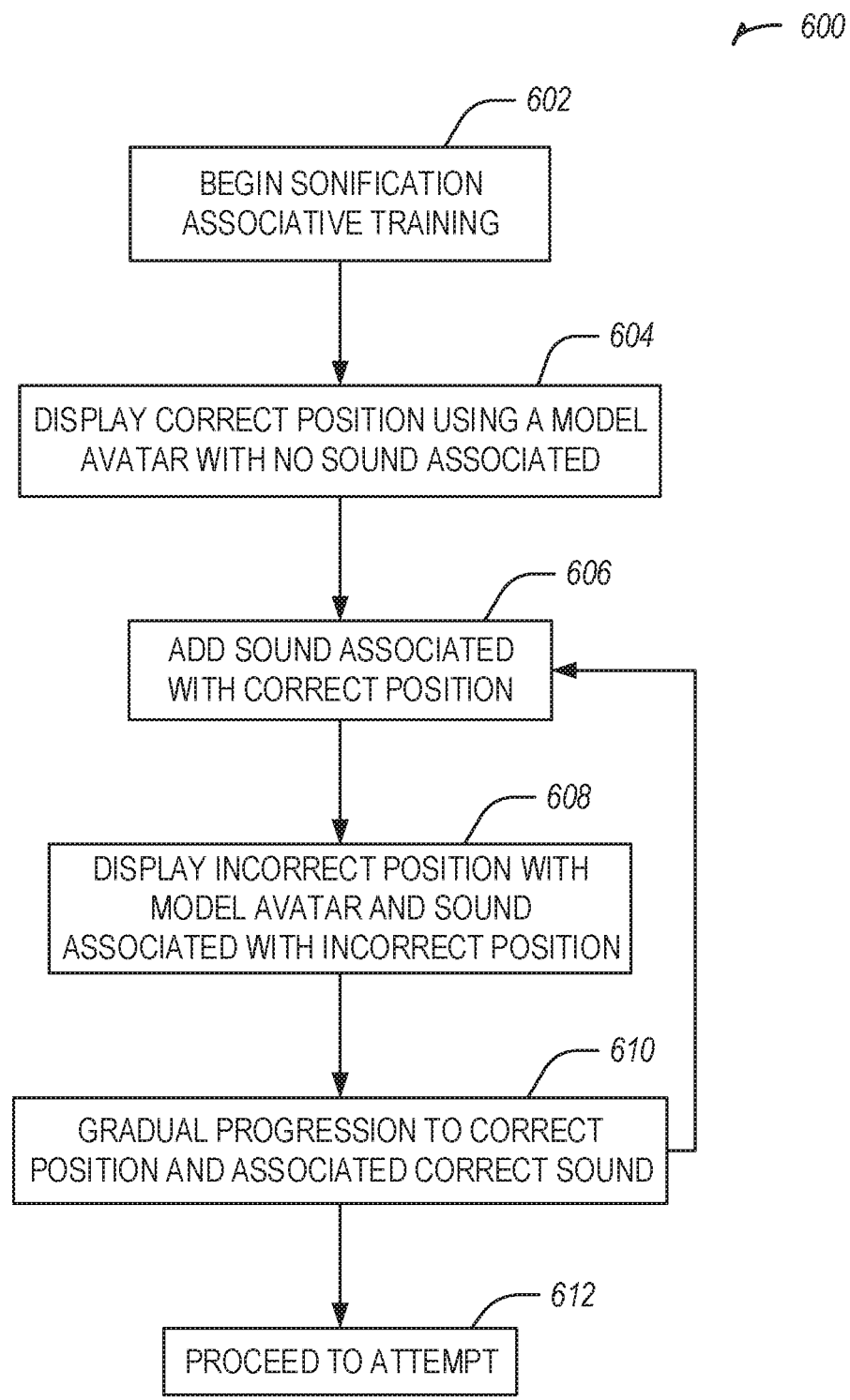
FIG. 6 illustrates a flowchart showing sonification associate training in accordance with some examples.

FIG. 6 illustrates a flowchart 600 showing sonification associate training in accordance with some examples. The flowchart 600 is described with respect to positions or poses, but may also be used with motion or movements.

The flowchart 600 includes an operation 602 to begin sonification associative training.

The flowchart 600 includes an operation 604 to display a correct position using a model avatar with no associated sound playing.

The flowchart 600 includes an operation 606 to add sound associated with the correct position. In an example, a visual highlight may be used to identify a relevant body segment).

The flowchart 600 includes an operation 608 to display an incorrect position with the model avatar and play a sound associated with the incorrect position. This operation may be repeated for different incorrect positions with different associated sounds (or the same sound, in certain cases).

The flowchart 600 includes an operation 610 to gradually progress to the correct position and gradually change the sound until the correct sound is played at the correct position. This process may be repeated, such as starting at operation 606.

The flowchart 600 includes an operation 612 to proceed to guiding or allowing the user to make an attempt at the position or motion.

FIG. 2D illustrates a sonification associative training system in accordance with some examples. An expert using a first headset 206 and a student 202 using a second headset 206 may view the expert avatar 208. An audio signal may be played (e.g., by a speaker or via headphones of the headsets 206). The audio signal may be changed according to associated visual positions of the expert avatar 208, as described below.

FIG. 2E illustrates pose matching system using auditory feedback in accordance with some examples. In the example shown in FIG. 2E, an audio signal may be played, and change according to positions of the student 202.

Externally produced real-time feedback is something that may not be available in the world of broadly commercially available human movement skills lessons. Some prototype versions of it have been tried with human coaches trying to identify for their students the exact moment something may happen or something goes wrong. The latency inherent in human communication may add additional complications when discussing what constitutes "real-time".

This Holographic Private Lesson system seeks to unleash the power of externally produced real-time feedback. Learning of skills depends on feedback loops where a student attempts the "operation" that constitutes the skill with a goal in mind. After, the student can move on to more attempts (repetitions) or seek feedback. At some stages of training reps without external feedback can be valuable, or training may be at a challenge level where errors may be made and as such adjustments based on the feedback may be employed. As such, the best training involves external feedback the majority of the time.

Feedback can be of many types. Consider the following examples related to physical, human movement, skills. Feedback may be about whether or not a goal related to an object hit another object occurred. Or it may be about what trajectory that hit object took. Maybe the student is trying to jump over a bar as in high jump or pole vault. In these you make it or you are done. When the student does not complete the task, the student can assess how close he or she came. In an example, with an instructor who can guide and interpret, feedback can be about the motion or even the muscle activity itself. In these cases the goal may not relate to the objects in play or the trajectory of a body when jumping. The goal may be just to move the body properly.

The smaller the feedback loop is in time, the more adjustments and then micro adjustments can occur in any given time frame. What if the feedback was instantaneous? The rate of adjustment of an athlete's technique may sky rocket. Constraints still apply related to the cognitive capacity of the athlete to perform a movement and interpret feedback at the same time, but real-time feedback gives a distinct advantage. The athlete may learn how to "decode" the information that the system provides so that it tells them something.

A form of feedback for the Holographic Private Lesson system is "sonification", or audio feedback such that the nature of the audio is directly tied to a measurement of the athlete's body. In an example, once this measurement is encoded in an audio form, it is very straightforward to transfer it over to a visual domain, which is to say that the understanding of the motion created through the audio feedback can be applied in the imagination using visualization. In an example, the system may provide a background color on the visual display device. In another example, the system may provide a background pattern. In an example, the idea is to abstract the information away from being directly tied to the motion in question enough to avoid a distraction. This allows the student to tap into it when useful or to keep their mind away from it when focusing on some other aspect of the training experience.

Consider that in the case forms of feedback discussed, there may be a "target quality". For sonification and background color, that target is actually a certain frequency (in the case of color, the visual system transcribes frequency into colors, so they are the same thing) which signals that the athlete is on target. In the case of background pattern, the target is a certain shape. As the athlete diverges from the target with their body position or timing, the feedback may diverge from this target quality. In an example, the sound may change, the color may change, or the shape may change.

The Holographic Private Lesson is described below with reference to the audio channel only for simplicity purposes, but analogous implementations in the other modes may be performed.

In order to show the attentive student how their position or motion may affect the feedback, the student may watch an avatar execute the target position or motion while a sample of the associated sound the system may make for each case is provided. The idea here is to give the student the tools to understand what the sound is telling them specific to the adjustment in body position that the system is measuring for.

In an embodiment, the following sequence may be used to create this associative training effect.

1. The correct pose or motion may be displayed one or more times with no sample feedback provided.
2. The correct pose or motion may be displayed with feedback showing the target sound.
   a. In the case of a pose the avatar may move slowly from a few different positions to the target position.
   b. In the case of a motion, the correct motion may be displayed.
3. Several incorrect examples may be displayed along with the sounds that may be heard if the student were to make the same errors.
   a. In the case of a pose, these incorrect examples may include motion and may show a good amount of the possible range of mistakes that can be made.
   b. In the case of a motion, several very poor motions may be shown.

4. Several incorrect examples may be displayed, for example with gradual improvement toward correctness. Once again, pose examples may show some motion to show the different possible errors and how the sound changes while converging to correct.

5. A few correct examples with appropriate "target" sounds may be shown to finish associative training before the athlete may try the motion for himself or herself.

The sound gradient may be designed to encourage convergence to correct. A couple of elements may facilitate this. First, the gradient may change more rapidly for a constant change in athlete position as the athlete's position approaches correct, to ensure the feedback can continue to offer salient difference for the micro-adjustments when close to a target. Second, when within a tight threshold around the target, the sound quality may change to a "target" sound that indicates that the athlete made it.

The gradient may be continuous or discrete. In a continuous version, the sound may vary directly as a function of distance from the target. In the discrete version, the sound may be at a single value for continuous bands of distance around the target. For example, when a joint is 15-19 degrees from the target position, it may have the same sound within that whole region of distance from the target. For other similarly defined ranges of distance from the target there may be a different sound. This may not preclude the possibility that the sound may vary continuously or discretely based on direction to the target (which is to say it may be a different sound when you are 17 degrees too small of an angle at a certain joint or 17 degrees too large of an angle at that joint).

In an embodiment that focuses on fine adjustment near the target, envision teaching an arm position that mimics the release point of a baseball pitch. This may mean that the upper arm of the throwing harm may be horizontal or positioned with the elbow slightly above the shoulder and the lower arm oriented angled forward (toward the direction that the ball is being thrown) at about a 45° angle from the vertical. Then the distinction between having the lower arm oriented too high (before release point, or less than 45° from the vertical) and having the lower arm too low (after release point, or more than 45° from the vertical) is marked by a changing in audio quality where on the upper side the tone is a constant note (say e-sharp) and after it is a variable note (which is to say the wavelength of the sound changes). In this case, the wavelength gets longer. This is equivalent to saying that the frequency gets lower and thus the note which describes the quality of the sound gets lower and lower. The goal is to find that exact spot where the sound goes from a constant tone to a varying tone.

An additional consideration is that verbal commands or even words displayed in the visual field of the display may be built into the system to help punctuate the feedback and to call attention to various aspects. A part Sonification Associative Training may teach the athlete the contextual meaning of each of those verbal or visual word-based commands using context demonstrations, explicit definitions, plus correct and incorrect examples.

The graphical embellishment 212 of FIG. 2B is described in more detail below. FIG. 2C illustrates a graphical embellishment 214 with a student avatar display system in accordance with some examples.

Display of avatars in a three-dimensional space which has the illusion of creating virtualized "presence" of the avatars to the users provides broad scope information about movement details whether specific to the expert model of the attempts at the technique by the student. In a Holographic Private Lesson scenario, this sheer amount of information is not problematic because the instructor can then direct the student to pay attention to specific aspects of either model or of comparisons between the models. In an example, it is an advantageous and valuable tool for an instructor to be able to add graphical embellishments to the imagery, either on the avatar or in the area surrounding the avatar. This is a more automatic way to bring the student's attention where the instructor wants it and make distinctions clear.

With respect to the expert model, the details of the motion are predetermined. Therefore, the nature of what one may like to point out about the expert avatar is subject to design in advance of any user engaging with the system. Deciding what may be emphasized in terms of movement elements in the expert model is a matter of domain expertise which can be gained from a lifetime of working within the sport or movement skills discipline or from scientific analysis of expert performers.

The specific nature of the visuals may be pre-fabricated for the expert model and may be constrained by considerations of both attention directing ability and information conveyance. In an example, the system may use extra brightness or contrasting colors to emphasize an area where one wants to draw attention. Color coding, line thickness, overt display of words or numbers, and external grid or angle reference images are good examples of ways to convey information within a graphical scheme. The following description seeks to expand upon some types of these graphical embellishments and encodings and show how they may be made to function in a Holographic Private Lesson system.

This sort of display may be used at many stages of a holographic private lesson, and embellished expert model imagery may certainly be used before a student attempt so as to make maximally salient the correction that the student is to make. Since this can be pre-fabricated, adjustments to the aspects of position, color, curvature, motion dynamics, and external measurement reference imagery can be made in advance or by hand.

Creating meaningful embellishments for a student's avatar is a different challenge. These embellishments are based on data that becomes available during the course of a Holographic Private Lesson. Doing this may rely on using a "slice" of the data coming out of any student's attempt where said slice may be characterized as limiting the scope of the data to a body segment or segments or to a certain time frame. Using the data to modify pre-established embellishment types may allow embellishments to be pre-planned or subject to the data specific to the student's motion as they attempted the technique (or are attempting the technique in a real-time case). One can expect a direct mapping between the sorts of embellishments that may be useful for the expert avatar and the ones that may be used to provide feedback on the student's motion via the student avatar. This may not strictly be the case, and it is useful to think about how these two cases may embody the sets of "embellishment types" because this allows us to focus on the difference between how expert avatar embellishments are achieved and how student avatar embellishments are achieved using the same embellishment type templates.

For each of the embellishments types, decisions may be made so that a technique can be tailored to each one. A first consideration is what shape may best convey the information in question. A second consideration is what location around the student avatar best binds the information to be provided in a way that makes clear to the student which body part or body action it is indicating. The third is how quantitative data can be obtained and then applied to create dynamics in the embellishment which convey the information about the movement that the student is to perform in that moment in order to improve.

The shape or form of the graphic is directly transferrable from an expert avatar case. The location of any embellishments around the avatar may be defined differently which is to say, dynamically, for the student avatar. It may be located around a relevant body part and may move with that body part. So, some slice of the user's position data may define the location of the embellishment whether that slice is the student's center of mass, center of base, foot position, head position, or other.

Another way may involve using multiple joints and applying an equation that may position the embellishment dynamically as those joints move. A good example is to think about an embellishment type that is focused on conveying a rotation action about the hips. A baseball pitch is a good example here. In a baseball pitch one can imagine force generation starting at the ground level with the athlete's feet and being transferred through the legs and core eventually up to the pitching hand. Experts routinely rotate their belly button from pointing roughly at first or third base (first base for a left-handed pitcher and third base for a right-handed pitcher) to pointing at home plate at a midpoint of the process of transferring force from the ground to the baseball in the hand. This rotation is achieved by swiveling the hips.

Positioning a curved arrow at hip level may be used, which emphasizes, at that specific time of the pitch where the rotation happens, that rotating action. This may be characterized to be best displayed a few inches off of the hips at hip level and without colliding with any of the avatar's body segments. This is to say it may float in space around the hips. In an example, it is a bit more complicated because as this action is taking place the knee of the leg which has made a stride toward home plate may be up close to hip level. To keep the curved arrow from colliding with the thigh, an additional positioning constraint may be used. This may try to keep the distance off the hips as defined, or instead of making the arrow be horizontally oriented relative to the hips it may be positioned so that given a certain distance from the hips in the direction of the exterior of the body, the distance between the knee on the opposite side from the throwing hand ("non-throwing side") and shoulder on the throwing hand side ("throwing side") of the body may be equal, or at least balanced. Finally, in order to keep it in front of the hips a constraint may be set up that controls for the distance from the non-throwing side hip joint.

A way to do this may include making it satisfy a system of equations. For example:

Distance from throwing side hip joint=X
Distance from non-throwing side hip joint=Y
Distance from throwing side shoulder joint=Distance from non-throwing side knee joint The above makes the distance between the throwing side shoulder joint and the non-throwing side knee joint equal. To control a ratio between them, a constant may be added as in the following.

Distance from throwing side hip joint=X
Distance from non-throwing side hip joint=Y
Distance from throwing side shoulder joint=C*Distance from non-throwing side knee joint Another consideration is that solving these may lead to multiple solutions. When this is the case, the one that minimizes the distance to either of the throwing side shoulder joint or the non-throwing side knee joint may be used (since these are governed by a certain ratio, choosing the minimum of one guarantees choosing the minimum of the other). So the result is an extra constraint like this.

Distance from throwing side hip joint=X
Distance from non-throwing side hip joint=Y
Distance from throwing side shoulder joint=Distance from non-throwing side knee joint
Min[Distance from throwing side shoulder joint]

These distances are calculated as defined by normal Euclidian geometry distance in three dimensions using a three-dimensional extension of the Pythagorean theorem.

With respect to the application of quantitative data to each of the types of embellishments that may be enabled for the student avatar, this takes one of a few forms. Some of the forms of data that can be applied include a variety of data that can be sourced from a skeletal tracking system.

Examples include:
Positional data for a body segment
Velocity data for a body segment
Acceleration data for a body segment
Angular relationships between two body segments
Angular velocity with respect to a joint between two body segments
Angular acceleration between two body segments
A mixture which represents multiple of the one type or of different types of data above
A calculation that leverages multiple of one type or of different types of data above as inputs Calculations may be any established, well-defined, operation of mathematics, and some examples may include differences between the rotational velocity of one joint and another at a certain portion of a technique or ratios between angles at two joints. It may also be powerful to calculate values which offer quantification of deviations in the student's data from the data associated with the ideal model and apply that data as an embellishment on the student avatar display. Also, velocity and acceleration are calculus calculations based on taking the derivative of a continuous function. The discrete approximations of these involve, for velocity, calculating the positional differences between body segment or angular data between subsequent time separated measurement instants and dividing each of these positional deltas by the time difference that the deltas are over. Acceleration may be done as a second operation that utilizes the calculated velocity values.

A few more questions may be answered in order to make these on-the-fly embellishments on top of the student avatar display. An operation which is implicitly assumed in the discussion above is to establish a coordinate system. Doing this generally entails establishing three directions which are mutually perpendicular to one another and to call those axes (x-axis, y-axis, and z-axis). These axes are generally imagined to be positioned such that they have "zero" values with respect to the other two axes. This is to say that the points on the x-axis have values y=0 and z=0 and that the same is mutually true for the other two axes with respect to each of the other axes. This being the case, the point at which all three axes intersect, (0, 0, 0), is said to be the origin point for the coordinate system. Then points in the space are given quantitative values with respect to the origin and each of the axes and this quantification forms the basis for the calculations. In an example, the establishment of this coordinate system is given and comes along for free with the data that comes from a skeletal tracking system. The system described here is assumed to be built with data coming in from a skeletal tracking system as a given, and establishing a separate coordinate system as described in this paragraph may be avoided.

The next question is, how can the quantities being derived from the student skeletal position data can be represented visually for student to absorb? The above description includes how a certain set of embellishments may be designed as ways of efficiently conveying specific information that is suited to enhancing the rate of learning by an individual of a certain technique. These may be decided upon using a mix of input from experts skilled in the art of teaching the techniques in question and an analysis of the features of the technique which appear not to be optional for expert performers of each technique based on a statistical analysis of the commonalities in the experts' techniques.

Each of these pieces of specific information that may be conveyed in the teaching process becomes a template for embellishment and that template contains the constraints already talked about when considering how to position the embellishments. The embellishments may be modified in real-time based on the student performance, as described below.

These modifications may be with respect to the visual quality that they embody. As a result, the modifications may be with respect to the shape, color, line thickness, or geometric pattern. For example, when the embellishment is a curved arrow which wraps around the student avatar's hips pointing in the intended direction of rotation, then that arrow may bet longer as a shape change to indicate a more forceful, and therefore faster accelerating, rotation is used. Alternatively, it may be better in some situations to shorten said arrow to show the student their shortfall in the rate of acceleration as opposed to showing a longer arrow to encourage the student.

Similarly, a color coding scheme may be used to show any of a shortfall, an overage, or correct performance. In an example, in the forward stride in hockey skating, after the propulsive push is made diagonally with components both toward the posterior and laterally to the side of the body of the same leg, the leg may be brought forward and back toward the point on the ice underneath the center of mass of the skater in order to support the body so the other leg can make its push. This action is called "recovery". It can be too far across the point underneath the skater's center of mass, not far enough and short of that point, or right on. One color coding scheme may leverage a blue and yellow make green type scheme. Blue may be to indicate that the student is not making it far enough. Yellow may indicate that the student recovered their leg too far. Finally, green can mean "go" as it does on the roads, in this case indicating that the athlete is recovering correctly and is thus closer to moving on to focusing on a different aspect of the technique or a different technique. This color modification may be displayed on the student avatar's leg or on an arrow representing the start and end-point of the foot which is displayed on the ground below the avatar.

In addition to color, a region on the embellishment may be "textured" with a geometric pattern. This may be an alternative to color modification or may be used in addition to color modification. Similar to the idea of using a blue and yellow makes green concept, a geometric pattern may include of an array of shapes that change, for example, from a triangle to a square to a pentagon. The array is some regular pattern of locations for the geometric shapes. An example is an array that includes the corners of repeating squares on a two-dimensional plane such that the squares do not overlap and also fill the available space. Another scheme is the location of the stars on the field of blue in the United States' flag. This "lattice" may be the same as the repeating squares array with the addition of another geometric figure in the centers of the squares in addition to the ones on the corners of the squares. So, these shapes being properly laid out in the region of the embellishment, they may then be modified in shape based on some aspect of the data of the student's movement.

In an example, the technique in question may be baseball pitching and the detail that may be taught is to have the lower arm of the throwing arm to be twenty degrees from a straight vertical as the arm moves toward release. When the lower arm is too close to vertical, the shape may be a pentagon (the closer to correct, the shorter the distance of one of the sides of the pentagon may be such that it may become more and more similar to a square). When it is too far from vertical, the shape may be an imperfect square (more accurately, an irregular 4-gon) where one of the sides is shortened. The further from vertical the upper arm gets, the shorter that side may get until a certain threshold where the length of the one shorter side may be zero and it may turn into a triangle. Finally, when the student's arm is right on, the shape may be a perfect square.

In order to couple these modifications to the student data, a few operations are used in designing each type of embellishment for each technique. Once the shape, location, and modification type or types are chosen, the modifications may be computationally coupled to the student's motion data. To do this the correct body segment or segments may be chosen. This may mean choosing data from the student's motion, or it may mean selecting data from the ideal technique model to be used as a comparison. Alternatively, the ideal technique model may be used just to determine what the target may be for the student's data at a given instant of time.

With the data sources selected, it may be transformed by an equation. In the case of a shape change, this equation may output a single number which may stretch the shape along a certain dimension or dimensions as a direct multiplication by that numerical factor. In an example, the system may make the shape longer or wider or making an "outline" structure on it narrower or wider.

In the case of color modification, the equation may output a number that either determines the color based on a standard computer display color coding scheme or determines a delta which may be the distance in color value space that each pixel's value may be modified by. In an example, the interior region of an arrow may turn blue for an error on one side of the target, red for an error on another side of the target and purple when on target. It is plausible to assume that the quantitative distance in a color display scheme from purple to blue and from red to purple may be roughly equal. In an example, purple may be the default color, or the color value may be changed proportional to the error distance between the student's data and the ideal model's data such that a large error on one side may add enough to the color value to change it to the red region of the color code and a large error on the other side subtracting enough to change it to the blue region.

In the case of pattern modification, many patterns are possible, and in an example, the example from above using the triangle, square, and pentagon scheme may be extended here. Effectively, the numerical value that may make this method work is the sum of the length of sides four and five of the pattern shape. Let's consider that the length of the other three sides are one unit. In that case, the sum of the lengths of sides four and five may be able to vary between zero and two units. When the value is zero then the shape may be a perfect triangle. When the value is one, then that length may go to making one extra side beyond the triangle, forming a perfect square. When the value is two, then it may make two extra sides to form a perfect pentagon. In between the values of zero and one, this length adds a partial side beyond the triangle so the shape may have three sides of one unit and one side of less than one unit, creating an irregular 4-gon. In between values of one and two the shape may wind up with four complete sides (full length) and one partial side meaning it may be an irregular pentagon with four sides of length one and one shorter side. This is organized so that the student may be able to see how close to a perfect square the shape is and zero in to that perfect square state.

Defining the quantity between zero and two that determines the shape is done as a result of an equation that takes the selected data as input and outputs one when the student is on target, a number between one and two when the student is off target one way, and a number between zero and one when the student is off target the other way.

The description above encompasses one of many geometric pattern schemes that may be used to encode a student's body segment's position relative to a target position. Another may encode this behavior with a similar pattern layout, such as by using curved or straight lines on the sides of a polygon chosen as the medium of representation. Imagine a hexagon where the sides of the hexagon may be curves which stretch toward the interior when the student is incorrect on one side of the target, be curves toward the exterior when the student is incorrect on the other side, and may be straight lines when the student is right on.

Consider a similar example of a pentagon to pentagram scheme. Here the geometric figure may be a regular pentagon when the student is right on. When the student is off, then the figure may morph into a pentagram. To understand how this may happen, imagine a set of five additional points on the pentagon. There may be one point on each side and these may be positioned exactly in between the points on the corners of their sides. Let's call these five points, "adjustment points". Then, when the student is right on, the adjustment points remain right on the sides of the pentagon. When the student is off, it may drag the five adjustment points toward the center of the pentagon dragging the lines that connect them to the points that make the corners of the pentagon with them. When the student is off beyond a certain threshold it may drag the adjustment points all the way such that the shape becomes a standard pentagram. In between being right on and the threshold the adjustment points may move toward the center of the pentagon an amount that represents how far off the student is with the measured aspect of their technique.

To illustrate this, let's consider the thrusting push direction in the ice hockey forward stride. While this is a bit oversimplified, the common wisdom is that the propulsive thrust in the forward stride in hockey may be directed at 45° from the rearward direction. It may be set up so that when the student is pushing 45° from the rear, that the equation may output zero corresponding to zero displacement of the adjustment points on the sides of the pentagon. The thresholds may be set such that at 0° from the rearward (pushing straight back) and 90° from the rearward (pushing straight sideways) may both result in the adjustment points being pulled all the way into pentagram position. Values further from the 45° target than these two thresholds may also be displayed as the pentagram. The system may be set up (combination of the equation and the coordinate system upon which the pentagon or pentagram visualization is displayed) such that a value of one coming from the equation may pull the adjustment points fully into the pentagram position. Then the equation may be:

$$APD = \min[\text{abs}(45° - \text{angle of student thrust direction as measured from the student's posterior direction}) - 45°, 1] \quad \text{EQUATION 1}$$

Where APD is the "adjustment points displacement", "abs" indicates to take the absolute value of the quantity in the quotation marks that follows, and min indicates to take the lesser of the two quantities of the value outputted by the "abs" formula and 1.

In order to make this match the actual displacement to change the pentagon into a pentagram, this APD value may be multiplied by the distance within the chosen coordinate system between the position of the adjustment points in the pentagon shape and the pentagram shape assuming that the five points on the corners of the pentagon remain in the same position.

This scheme gives no information about which direction the student was off. This information may be provided within another of the display modes wither it be line thickness, overall embellishment shape, or some form of color coding.

There is another scheme for creating embellishments that winds up being "external" with respect to the student or expert avatar, or may be generated through the persistence of imagery specific to earlier parts of the technique. In an example, freeze frames of the full avatar or specific segments of the avatar may persist as a replay of the technique proceeds and may even persist in perpetuity after the replay has finished so that the succession of positions can be studied at many angles as the users are able to move their viewing angle around the imagery. The effect is characterized as positions that you may see during the motion of a technique in a dark room using a strobe light, for example, where each of those images that may be presented by the strobe light are retained even as the student avatar continues forward with the motion.

Figure 7:
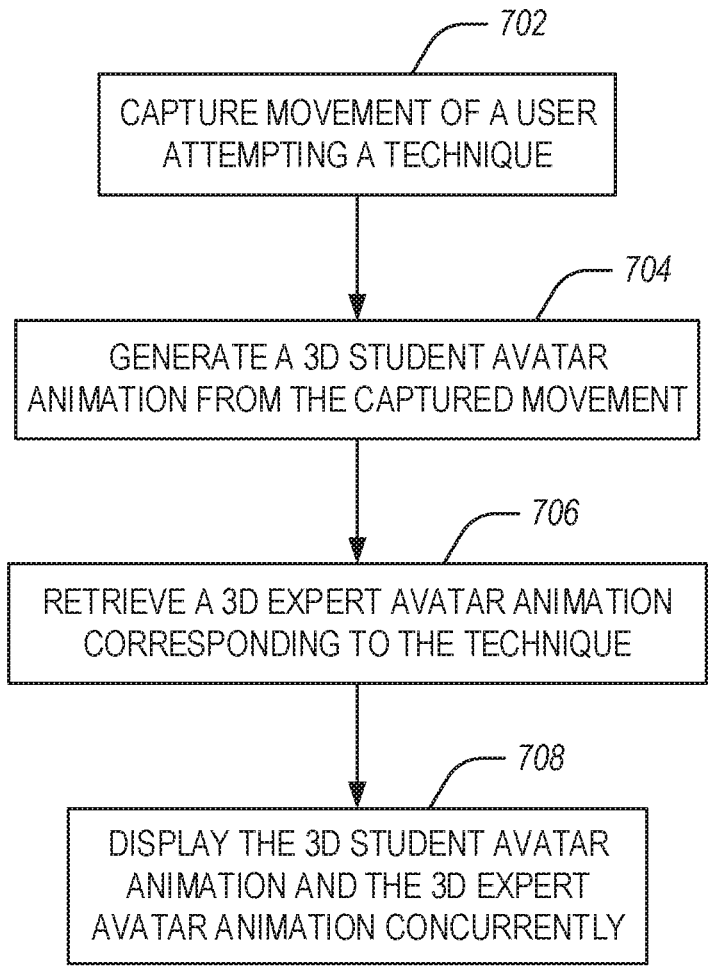
FIG. 7 illustrates a flowchart showing a technique for presenting avatars in accordance with some examples.

FIG. 7 illustrates a flowchart showing a technique 700 for presenting avatars in accordance with some examples. The technique 700 includes an operation 702 to capture movement of a user attempting a technique. Operation 702 may use a camera, a sensor, or the like to capture user movement or a pose. The technique 700 includes an operation 704 to generate a 3D student avatar animation from the captured movement. The technique 700 includes an operation 706 to retrieve a 3D expert avatar animation corresponding to the technique.

The technique 700 includes an operation 708 to display the 3D student avatar animation and the 3D expert avatar animation concurrently (e.g., at the same time with the avatars played simultaneous in time or with a delay or offset). In an example, operation 708 includes displaying the 3D student avatar animation and the 3D expert avatar animation as holograms, such as using a mixed reality device. Operation 708 may include displaying the 3D student avatar animation and the 3D expert avatar animation with a visual differentiation (e.g., brightness, salience, color, etc.).

The technique 700 may include automatically aligning the 3D student avatar animation and the 3D expert avatar animation by modifying at least one of a duration, a direction, a physical size of the 3D student avatar animation or the 3D expert avatar animation, or the like.

The technique 700 may include modifying an avatar brightness level of the 3D student avatar animation or the 3D expert avatar animation before displaying the 3D student avatar animation and the 3D expert avatar animation. Modifying the avatar brightness level may include modifying a brightness or salience for a skin layer, a muscle layer, a skeletal layer, or the like, of the 3D student avatar animation or the 3D expert avatar animation.

The technique 700 may include capturing a gesture or a voice control, the gesture or the voice command indicating a playback control of the 3D student avatar animation or the 3D expert avatar animation. The technique 700 may include using a microphone to capture a voice control, the voice command indicating a playback control of the 3D student avatar animation or the 3D expert avatar animation.

Figure 8:
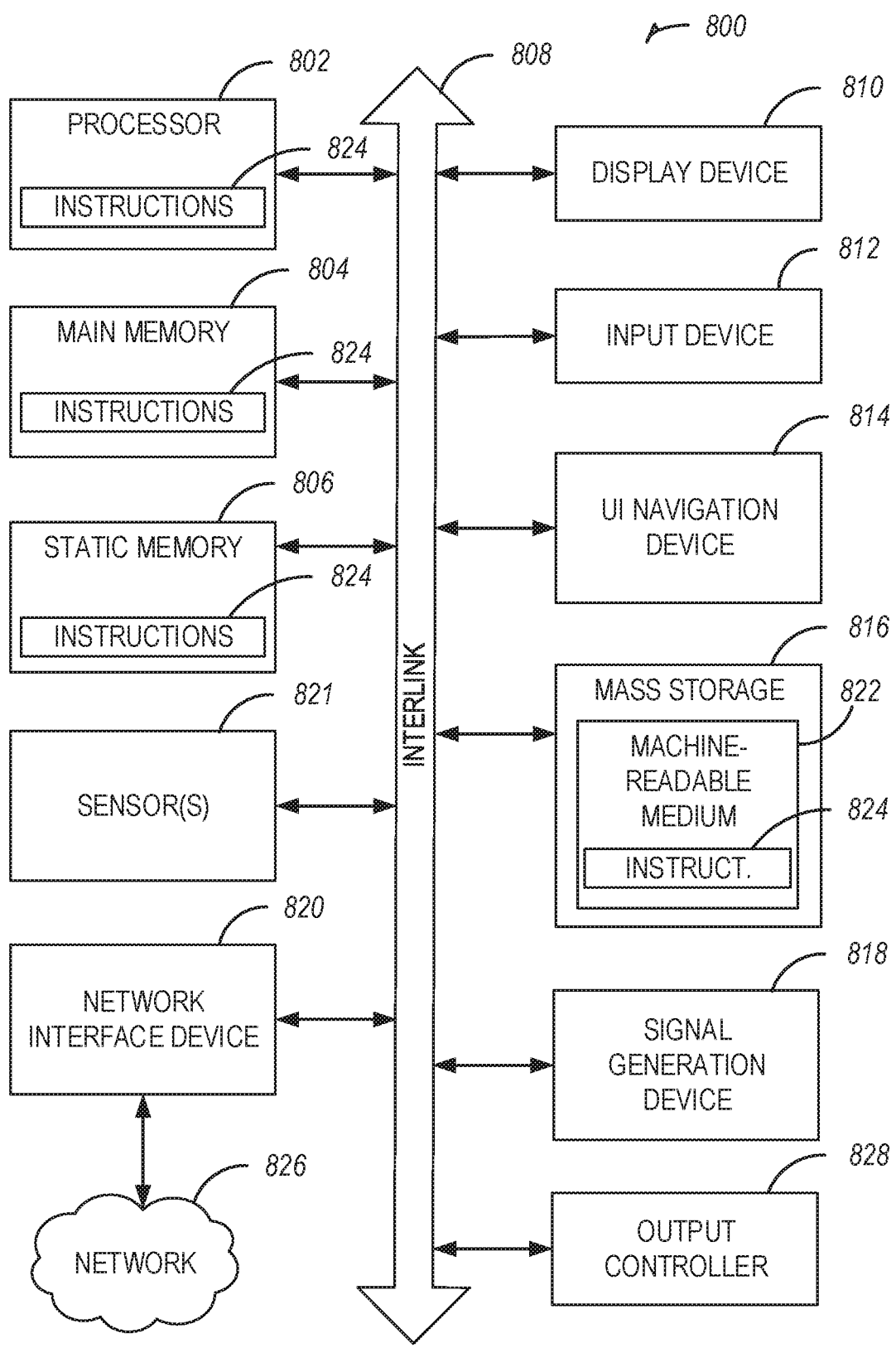
FIG. 8 illustrates generally an example of a block diagram of a machine upon which any one or more of the techniques discussed herein may perform in accordance with some embodiments.

FIG. 8 illustrates generally an example of a block diagram of a machine 800 upon which any one or more of the techniques discussed herein may perform in accordance with some embodiments. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, alphanumeric input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 that is non-transitory on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks, magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, 4G/5G Networks), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

Example 1 is a system comprising: a sensor to capture movement of a user attempting a technique; a processor, coupled to memory, the memory including instructions, which when executed by the processor, cause the processor to: generate a 3D student avatar animation from the captured movement; and retrieve a 3D expert avatar animation corresponding to the technique; and a display device to display the 3D student avatar animation and the 3D expert avatar animation concurrently.

In Example 2, the subject matter of Example 1 includes, wherein the display device is a mixed reality device configured to display the 3D student avatar animation and the 3D expert avatar animation as holograms.

In Example 3, the subject matter of Examples 1-2 includes, wherein the instructions further cause the processor to automatically align the 3D student avatar animation and the 3D expert avatar animation by modifying at least one of a duration, a direction, or a physical size of the 3D student avatar animation or the 3D expert avatar animation.

In Example 4, the subject matter of Examples 1-3 includes, wherein the instructions further cause the processor to modify an avatar brightness level of the 3D student avatar animation or the 3D expert avatar animation before outputting the 3D student avatar animation and the 3D expert avatar animation to the display device for display.

In Example 5, the subject matter of Example 4 includes, wherein to modify the avatar brightness level, the instructions further cause the processor to modify a brightness or salience for a skin layer, a muscle layer, or a skeletal layer of the 3D student avatar animation or the 3D expert avatar animation.

In Example 6, the subject matter of Examples 1-5 includes, a microphone to capture a voice control, the voice command indicating a playback control of the 3D student avatar animation or the 3D expert avatar animation.

In Example 7, the subject matter of Examples 1-6 includes, wherein the system further comprises a camera to capture a gesture, the gesture indicating a playback control of the 3D student avatar animation or the 3D expert avatar animation.

In Example 8, the subject matter of Examples 1-7 includes, wherein the display device is to display the 3D student avatar animation and the 3D expert avatar animation with a visual differentiation.

In Example 9, the subject matter of Example 8 includes, wherein the visual differentiation includes a first color for the 3D student avatar animation and a second color for the 3D expert avatar animation.

Example 10 is a method comprising: capturing, using a sensor, movement of a user attempting a technique, generating, using a processor, a 3D student avatar animation from the captured movement; retrieving a 3D expert avatar animation corresponding to the technique; and displaying the 3D student avatar animation and the 3D expert avatar animation concurrently.

In Example 11, the subject matter of Example 10 includes, wherein displaying the 3D student avatar animation and the 3D expert avatar animation concurrently includes displaying the 3D student avatar animation and the 3D expert avatar animation as holograms using a mixed reality device.

In Example 12, the subject matter of Examples 10-11 includes, automatically aligning the 3D student avatar animation and the 3D expert avatar animation by modifying at least one of a duration, a direction, or a physical size of the 3D student avatar animation or the 3D expert avatar animation.

In Example 13, the subject matter of Examples 10-12 includes, modifying an avatar brightness level of the 3D student avatar animation or the 3D expert avatar animation before displaying the 3D student avatar animation and the 3D expert avatar animation.

In Example 14, the subject matter of Example 13 includes, wherein modifying the avatar brightness level includes modifying a brightness or salience for a skin layer, a muscle layer, or a skeletal layer of the 3D student avatar animation or the 3D expert avatar animation.

In Example 15, the subject matter of Examples 10-14 includes, capturing a gesture or a voice control, the gesture or the voice command indicating a playback control of the 3D student avatar animation or the 3D expert avatar animation.

In Example 16, the subject matter of Examples 10-15 includes, wherein the 3D student avatar animation and the 3D expert avatar animation are displayed with a visual differentiation.

In Example 17, the subject matter of Example 16 includes, wherein the visual differentiation includes a first color for the 3D student avatar animation and a second color for the 3D expert avatar animation.

Example 18 is a non-transitory machine-readable medium including instructions, which when executed by a processor, cause the processor to perform operations to: capture movement of a user attempting a technique; generate a 3D student avatar animation from the captured movement; retrieve a 3D expert avatar animation corresponding to the technique; and display the 3D student avatar animation and the 3D expert avatar animation concurrently.

In Example 19, the subject matter of Example 18 includes, wherein the instructions to display the 3D student avatar animation and the 3D expert avatar animation concurrently include instructions to display the 3D student avatar animation and the 3D expert avatar animation as holograms using a mixed reality device.

In Example 20, the subject matter of Examples 18-19 includes, wherein the instructions further cause the processor to: automatically align the 3D student avatar animation and the 3D expert avatar animation by modifying at least one of a duration, a direction, or a physical size of the 3D student avatar animation or the 3D expert avatar animation.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A system comprising:
a sensor to capture movement of a user attempting a technique;
a processor, coupled to memory, the memory including instructions, which when executed by the processor, cause the processor to:
generate a 3D student avatar animation from the captured movement; and
retrieve a 3D expert avatar animation corresponding to the technique; and
a display device to display the 3D student avatar animation and the 3D expert avatar animation concurrently;
wherein the processor is further caused to receive a user adjustment, separate from the captured movement of the user attempting the technique, the user adjustment modifying a distance between a reference point of the 3D student avatar animation and a reference point of the 3D expert avatar animation for displaying the 3D student avatar animation and the 3D expert avatar animation concurrently on the display device, and wherein the display device is further configured, in response to receiving the user adjustment, to move an entirety of one of the 3D student avatar animation or the 3D expert avatar animation according to the user adjustment to the distance to cause the user adjustment to the distance to be displayed.

2. The system of claim 1, wherein the display device is a mixed reality device configured to display the 3D student avatar animation and the 3D expert avatar animation as holograms.

3. The system of claim 1, wherein the instructions further cause the processor to automatically align the 3D student avatar animation and the 3D expert avatar animation by modifying at least one of a duration, a direction, or a physical size of the 3D student avatar animation or the 3D expert avatar animation.

4. The system of claim 1, wherein the instructions further cause the processor to modify an avatar brightness level of the 3D student avatar animation or the 3D expert avatar animation before outputting the 3D student avatar animation and the 3D expert avatar animation to the display device for display.

5. The system of claim 4, wherein to modify the avatar brightness level, the instructions further cause the processor to modify a brightness or salience for a skin layer, a muscle layer, or a skeletal layer of the 3D student avatar animation or the 3D expert avatar animation.

6. The system of claim 1, further comprising a microphone to capture a voice control, the voice control indicating a playback control of the 3D student avatar animation or the 3D expert avatar animation.

7. The system of claim 1, wherein the system further comprises a camera to capture a gesture, the gesture indicating a playback control of the 3D student avatar animation or the 3D expert avatar animation.

8. The system of claim 1, wherein the display device is to display the 3D student avatar animation and the 3D expert avatar animation with a visual differentiation.

9. The system of claim 8, wherein the visual differentiation includes a first color for the 3D student avatar animation and a second color for the 3D expert avatar animation.

10. A method comprising:
capturing, using a sensor, movement of a user attempting a technique;
generating, using a processor, a 3D student avatar animation from the captured movement;
retrieving a 3D expert avatar animation corresponding to the technique;
displaying the 3D student avatar animation and the 3D expert avatar animation concurrently;
receiving a user adjustment, separate from the captured movement of the user attempting the technique, the user adjustment modifying a distance between a reference point of the 3D student avatar animation and a reference point of the 3D expert avatar animation for displaying the 3D student avatar animation and the 3D expert avatar animation concurrently on the display device; and
moving, in response to receiving the user adjustment, an entirety of one of the 3D student avatar animation or the 3D expert avatar animation according to the user adjustment to the distance to cause the user adjustment to the distance to be displayed.

11. The method of claim 10, wherein displaying the 3D student avatar animation and the 3D expert avatar animation concurrently includes displaying the 3D student avatar animation and the 3D expert avatar animation as holograms using a mixed reality device.

12. The method of claim 10, further comprising automatically aligning the 3D student avatar animation and the 3D expert avatar animation by modifying at least one of a duration, a direction, or a physical size of the 3D student avatar animation or the 3D expert avatar animation.

13. The method of claim 10, further comprising modifying an avatar brightness level of the 3D student avatar animation or the 3D expert avatar animation before displaying the 3D student avatar animation and the 3D expert avatar animation.

14. The method of claim 13, wherein modifying the avatar brightness level includes modifying a brightness or salience for a skin layer, a muscle layer, or a skeletal layer of the 3D student avatar animation or the 3D expert avatar animation.

15. The method of claim 10, further comprising capturing a gesture or a voice control, the gesture or the voice control indicating a playback control of the 3D student avatar animation or the 3D expert avatar animation.

16. The method of claim 10, wherein the 3D student avatar animation and the 3D expert avatar animation are displayed with a visual differentiation.

17. The method of claim 16, wherein the visual differentiation includes a first color for the 3D student avatar animation and a second color for the 3D expert avatar animation.

18. A non-transitory machine-readable medium including instructions, which when executed by a processor, cause the processor to perform operations to:
capture movement of a user attempting a technique;
generate a 3D student avatar animation from the captured movement;
retrieve a 3D expert avatar animation corresponding to the technique;

display the 3D student avatar animation and the 3D expert avatar animation concurrently;

receive a user adjustment, separate from the captured movement of the user attempting the technique, the user adjustment modifying a distance between a reference point of the 3D student avatar animation and a reference point of the 3D expert avatar animation for displaying the 3D student avatar animation and the 3D expert avatar animation concurrently on the display device; and move, in response to receiving the user adjustment, an entirety of one of the 3D student avatar animation or the 3D expert avatar animation according to the user adjustment to the distance to cause the user adjustment to the distance to be displayed.

19. The non-transitory machine-readable medium of claim 18, wherein the instructions to display the 3D student avatar animation and the 3D expert avatar animation concurrently include instructions to display the 3D student avatar animation and the 3D expert avatar animation as holograms using a mixed reality device.

20. The non-transitory machine-readable medium of claim 18, wherein the instructions further cause the processor to: automatically align the 3D student avatar animation and the 3D expert avatar animation by modifying at least one of a duration, a direction, or a physical size of the 3D student avatar animation or the 3D expert avatar animation.

* * * * *